INVENTORS
ROBERT S. BRADSHAW
WALTER HANSTEIN
HARRY R. OTT
WINSTON C. SHEPPARD
BY
AGENT

Oct. 3, 1961     R. S. BRADSHAW ET AL     3,002,689
MULTIPLIER ACCOUNTING MACHINE
Filed March 31, 1958                            21 Sheets-Sheet 3

INVENTORS.
ROBERT S. BRADSHAW
WALTER HANSTEIN
BY   HARRY R. OTT
WINSTOR C. SHEPPARD

AGENT

INVENTORS
ROBERT S. BRADSHAW
WALTER HANSTEIN
HARRY R. OTT
WINSTON C. SHEPPARD

BY

AGENT

Oct. 3, 1961    R. S. BRADSHAW ET AL    3,002,689
MULTIPLIER ACCOUNTING MACHINE
Filed March 31, 1958    21 Sheets-Sheet 6

*INVENTORS*
ROBERT S. BRADSHAW
WALTER HANSTEIN
HARRY R. OTT
WINSTON C. SHEPPARD
*BY*
AGENT

Oct. 3, 1961   R. S. BRADSHAW ET AL   3,002,689
MULTIPLIER ACCOUNTING MACHINE
Filed March 31, 1958   21 Sheets-Sheet 7

INVENTORS
ROBERT S. BRADSHAW
WALTER HANSTEIN
HARRY R. OTT
WINSTON C. SHEPPARD
BY
AGENT

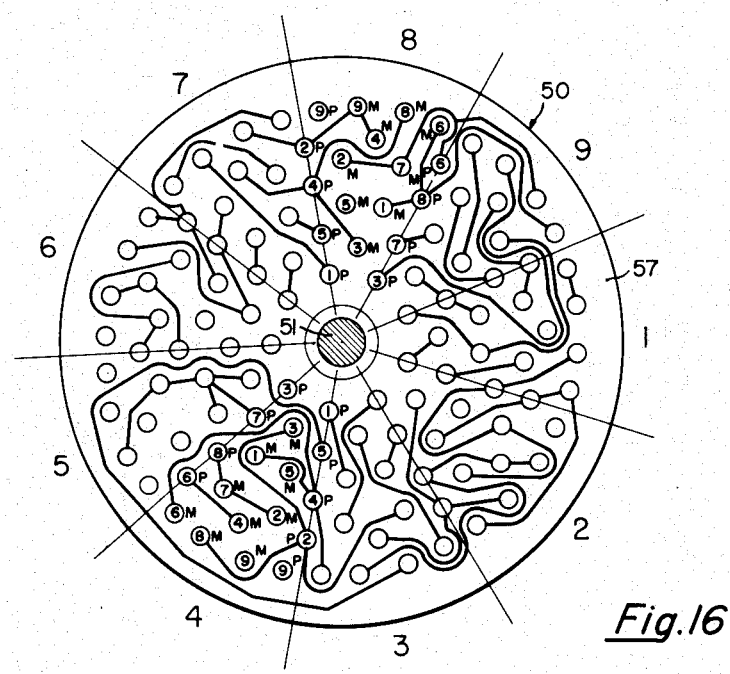

Oct. 3, 1961  R. S. BRADSHAW ET AL  3,002,689
MULTIPLIER ACCOUNTING MACHINE
Filed March 31, 1958  21 Sheets-Sheet 9
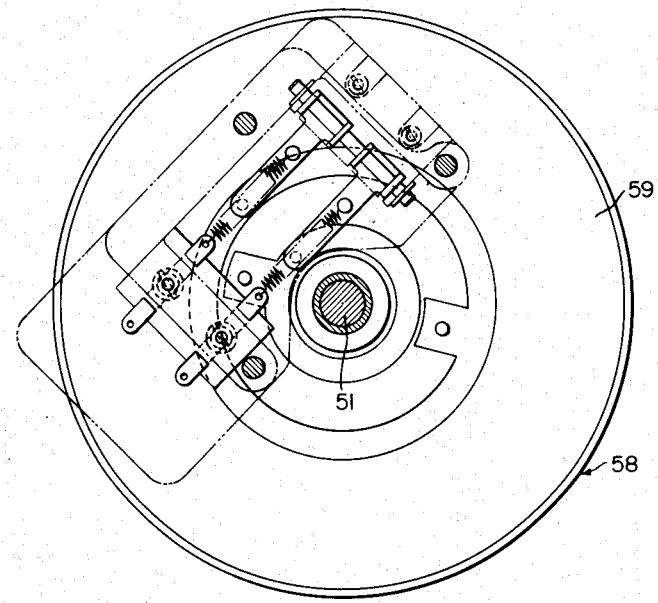
_Fig. 17_
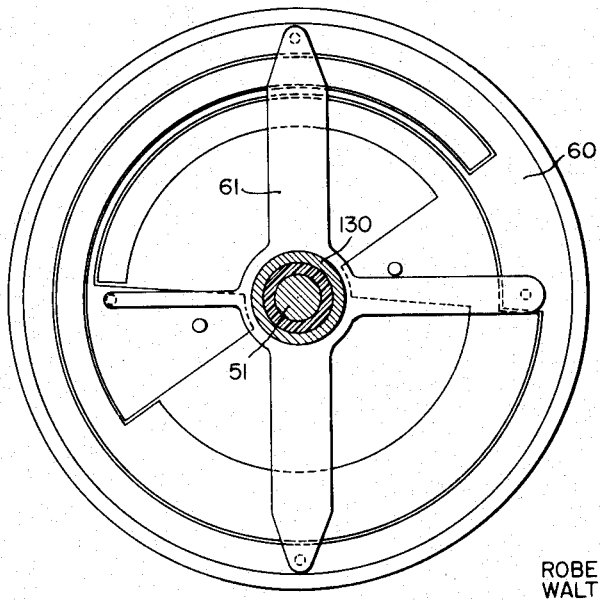
_Fig. 18_
INVENTORS.
ROBERT S. BRADSHAW
WALTER HANSTEIN
HARRY R. OTT
WINSTON C. SHEPPARD
BY
AGENT Oct. 3, 1961   R. S. BRADSHAW ET AL   3,002,689
MULTIPLIER ACCOUNTING MACHINE
Filed March 31, 1958   21 Sheets-Sheet 10

INVENTORS
ROBERT S. BRADSHAW
WALTER HANSTEIN
HARRY R. OTT
WINSTON C. SHEPPARD
BY

AGENT

INVENTORS
ROBERT S. BRADSHAW
WALTER HANSTEIN
HARRY R. OTT
WINSTON C. SHEPPARD
BY
AGENT

Oct. 3, 1961    R. S. BRADSHAW ET AL    3,002,689
MULTIPLIER ACCOUNTING MACHINE
Filed March 31, 1958    21 Sheets-Sheet 12

INVENTORS.
ROBERT S. BRADSHAW
WALTER HANSTEIN
HARRY R. OTT
WINSTON C. SHEPPARD
BY
AGENT

Oct. 3, 1961   R. S. BRADSHAW ET AL   3,002,689
MULTIPLIER ACCOUNTING MACHINE
Filed March 31, 1958   21 Sheets-Sheet 13

INVENTORS
ROBERT S. BRADSHAW
WALTER HANSTEIN
HARRY R. OTT
WINSTON C. SHEPPARD

BY

AGENT

Oct. 3, 1961    R. S. BRADSHAW ET AL    3,002,689
MULTIPLIER ACCOUNTING MACHINE

Filed March 31, 1958    21 Sheets-Sheet 14

INVENTORS
ROBERT S. BRADSHAW
WALTER HANSTEIN
BY  HARRY R. OTT
WINSTON C. SHEPPARD

AGENT

Oct. 3, 1961  R. S. BRADSHAW ET AL  3,002,689
MULTIPLIER ACCOUNTING MACHINE
Filed March 31, 1958  21 Sheets-Sheet 18

INVENTORS
ROBERT S. BRADSHAW
WALTER HANSTEIN
HARRY R. OTT
BY WINSTON C. SHEPPARD

AGENT 3,002,689
MULTIPLIER ACCOUNTING MACHINE
Robert S. Bradshaw, Broomall, Walter Hanstein, Villanova, Harry R. Ott, Philadelphia, and Winston C. Sheppard, Jarrettown, Pa., assignors to Burroughs Corporation, Detroit, Mich., a corporation of Michigan
Filed Mar. 31, 1958, Ser. No. 724,985
26 Claims. (Cl. 235—160)

The present invention relates to multiplying systems and apparatus, and more particularly to a multiplying unit as a separate entity or as a component of a complete accounting machine such as is used for arithmetic calculations.

While the apparatus of the invention is of broader applicability, it is particularly useful in conjunction with accounting machines of the type such as that disclosed in United States Patent 2,629,549 to Butler and assigned to the assignee of the present invention, enabling such machines to accomplish multiplication in addition to their usual functions. Other components of such multiplying apparatus have been described and claimed in the following identified copending applications, all assigned to the assignee of the present invention: Hanstein, Friction Clutch, Serial Number 587,058, filed May 24, 1957, now Patent No. 2,961,079; Jones et al., Accounting Machine Control Mechanism, Serial Number 645,537, filed March 12, 1957; Jones, Program Selecting Apparatus for an Automatic Machine, Serial Number 646,414, filed March 15, 1957, now Patent No. 2,981,467; Hanstein et al., Clutch, Serial Number 677,541, filed August 12, 1957, now Patent No. 2,957,962; and Hanstein et al., Multiplier Accumulator, Serial Number 693,779, filed October 31, 1957.

An important object of the present invention is to provide an improved multiplying system and apparatus which makes use of the right and left hand components method of multiplication wherein the generated partial product components are successively channeled to and added in an accumulator.

Another object of the invention is to provide multiplying apparatus producing partial product components as a result of the operation of keys on a keyboard, either as a part of the apparatus or as a part of an accounting machine.

Another object of the invention is to provide multiplication apparatus operative through a complete sequence of operations during which digits of the multiplicand are multiplied by selected digits of the multiplier taken in turn, starting with the last significant digit to produce alternately the right hand components and then the left hand components.

A further object is to provide in such apparatus a plurality of decimal shifts in accordance with various magnitudes of decimal numbers to be multiplied.

A still further object is to provide a multiplier unit operative to select a digit to be used as a multiplier, and at the same time locate the partial product components resulting from the multiplication in the proper columns of an accumulator.

Still another object of the invention is to provide such a multiplying unit which is effective to initiate round-off and clear cycles in an associated accumulator.

In order to set forth the invention so that it may be clearly understood by those skilled in the art, a preferred embodiment thereof has been illustrated in association with an accounting machine of the type shown and described in the above-identified Butler patent, but it is not intended that its use be so limited. Alterations have been made, and attachments added to the machine, making possible its automatic performance of multiplication in addition to its normal functions. The numbers to be multiplied, the multiplicand and the multiplier, are entered into the keyboard of the basic machine, or may be taken from the accumulators or crossfooters in the machine. The two amounts are each stored in separate banks of electrical switch assemblies by means of add racks in the machine, each switch assembly being associated with one of the add racks. Each digit of each amount is represented by the closure of normally open contacts, each corresponding to one of the digits from 0 to 9 and only one in each assembly is closed at any given time. Details of such a switch bank are disclosed in the above-identified Jones et al. application.

The multiplication system used by the machine makes use of the right and left hand components method of multiplication, and the summation of the partial products so generated in an accumulator of the type disclosed in the above identified Hanstein et al. application, Serial Number 693,779. The multiplicand is multiplied successively by each digit of the multiplier by means of a multiplying unit as disclosed in the present application, thus to generate partial products which are passed on to the accumulator in the form of electrical pulses from a pulse generator associated therewith. The accumulator functions electromechanically to add the partial products which are read into it and then mechanically to transfer the total through the add racks into the accounting machine, where they may be stored in crossfooters, or printed out.

In general, the multiplying unit performs all of the actual multiplication with the exception of the accumulation of partial products which is performed by the apparatus shown and described in the above identified Hanstein et al. application entitled "Multiplier Accumulator." More specifically the multiplying unit operating in conjunction with the storage switches, mentioned above, and a pulse generator provides the electrical signals representative of partial products which are subsequently channeled into the proper columns of the multiplier accumulator.

More specifically, the multiplying unit comprises two major functional units which are identified as the "partial products shifter" and the "function table." The shifter functions to locate each digit other than zero in the multiplier storage switch bank, to fix the decimal point over which the product is to be printed and/or accumulated in accordance with the dictates of a program selector, and to channel the signals representative of the partial products into the correct columns of the accumulator. The function table mechanizes the right and left hand multiplication tables for all numbers from 1 through 9. In addition to the major functional units just described, the multiplying unit contains certain switching elements including a platen which are instrumental in controlling the sequencing of the multiplication routine, including round-off and clear.

The shifter essentially consists of three printed circuit disks, the right hand shifter disk, the left hand shifter disk and the auxiliary control disk, all rotatably mounted, and clutch controlled. The right hand shifter disk primarily is operative to route the right hand components of the partial product to the correct columns of the multiplier accumulator in accordance with a selected decimal position. The left hand shifter disk performs for the left hand component of the partial products an identical function to that performed by the right hand shifter disk for the right hand components of the partial products. The auxiliary control disk provides a means whereby on command the left hand shifter disk may be aligned in direct relationship to the right hand shifter disk.

The function table assembly very much resembles the shifter in physical appearance and comprises three disks as does the shifter, including a right hand function table disk, a left hand function table disk and a function table auxiliary disk, all rotatably mounted and clutch controlled. The right hand function table disk is rotatable to any one of nine possible positions to connect nine leads coming from the pulse generator with nine digit busses of the multiplicand storage switches, thus to provide switching representative of the right hand component of the partial product. The left hand function table disk is similar to the right hand function table disk except that this disk provides switching representative of the left hand component of the partial product rather than of the right hand. The function table auxiliary disk serves to position the left hand function table disk upon command in correct relationship to the right hand function table disk.

The above discussion of the multiplier unit has been purposely exceeding brief. The unit is simply a switch performing all of the actual multiplication with the exception of the accumulation of partial products, and may before clearly understood from the following detailed description in conjunction with the attached drawings, wherein:

FIG. 15 is a face view of the right hand function table disk showing the selector circuit, taken on line 15—15 of FIG. 2;

FIG. 16 is a face view of the right hand function table disk showing the printed multiplying function table circuits for right hand components, taken on line 16—16 of FIG. 2;

FIG. 17 is a face view of the auxiliary function table disk taken on line 17—17 of FIG. 2, and showing the follow-up commutator circuit;

FIG. 18 is a face view of the auxiliary function table disk showing the follow-up circuit taken on line 18—18 of FIG. 2;

Figure 1:
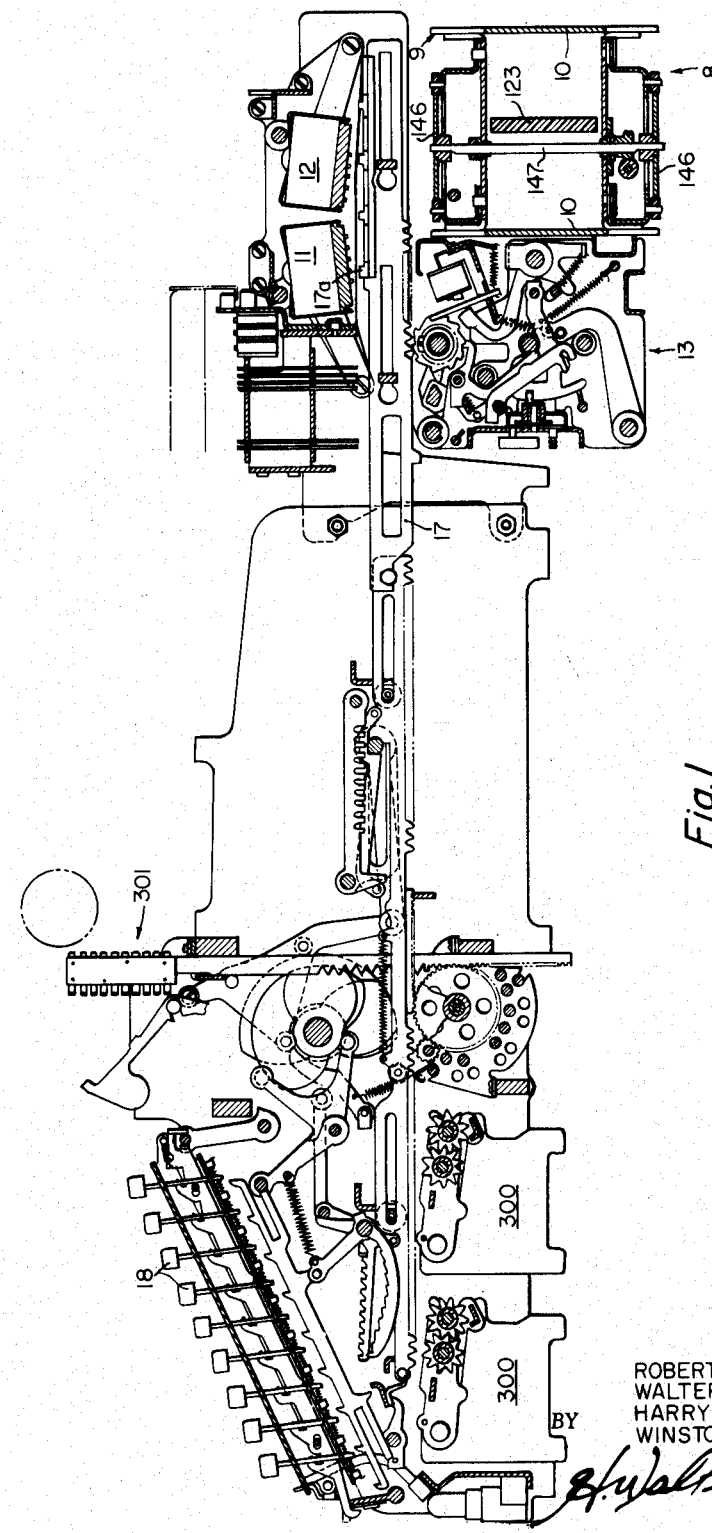
FIG. 1 is a transverse vertical sectional view through an accounting machine of the aforesaid Butler type modified for multiplying purposes.
Figure 1A:
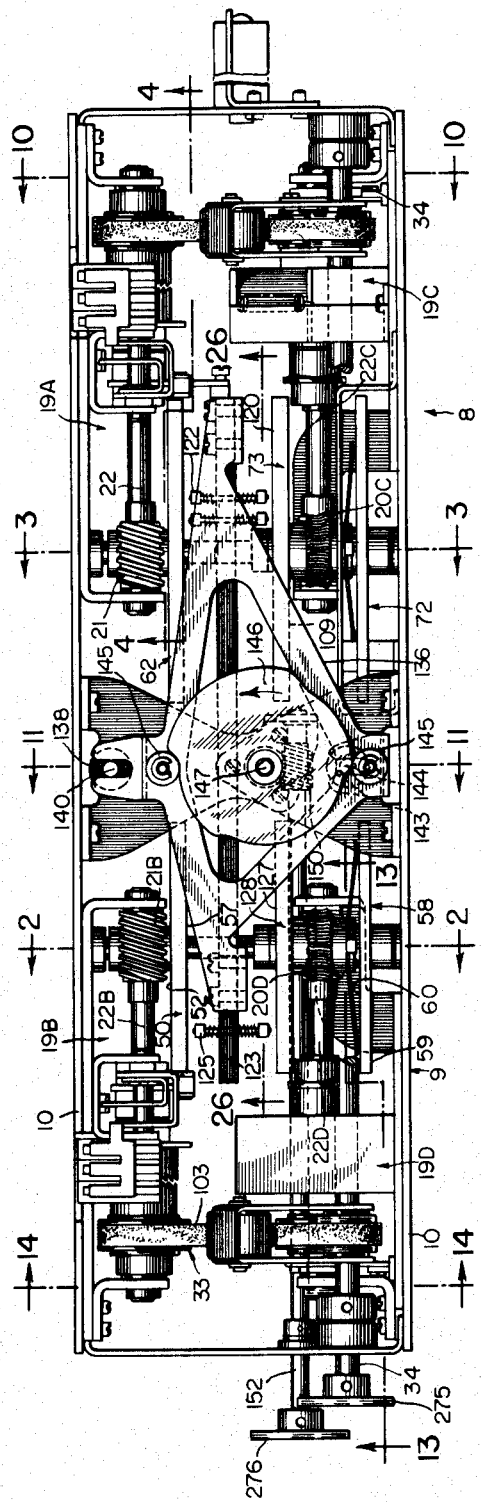
FIG. 1A is a plan view of a multiplier unit in accordance with the present invention.

Referring more specifically to the details of the drawings, and first to FIGS. 1 and 1A thereof, it is seen that the multiplier unit, identified generally by the numeral 8, is housed in a casing 9 for assembly in the accounting machine 10 and conveniently located at the rear of the machine for transmitting computations and components from banks 11 and 12 of digit storing switches, which may be constructed in accordance with those shown in the above identified Jones et al. application, to an accumulator unit 13 such as that shown in the above identified Hanstein et al. application. The switch bank 11 functions as a multiplier storage unit and the bank 12 as the multiplicand storage unit. The bank 11, see FIG. 29, comprises twelve rows of parallel common conductors or busses 14 for columns intersecting nine transverse parallel rows of digit busses 15 corresponding to the digits 1 through 9, with switches 16 located respectively at the intersections of the conductors. The bank 12 comprises a like network of conductors and switches. The two banks are mounted for movement toward and away from differentially movable coded racks 17 (FIG. 1) for selective switch closing and zero switch opening, corresponding to the positions of the coded racks determined by the depression of selected keys 18 of the accounting machine, such selection and operation preferably being in accordance with that described in the above mentioned Jones et al. application and the aforesaid Butler patent.

Figure 2:
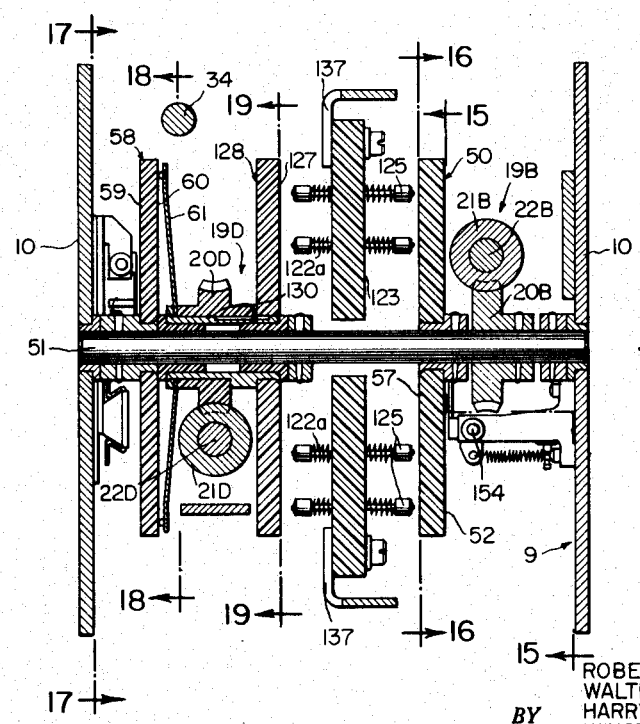
FIG. 2 is a section view on line 2—2 of FIG. 1A.
Figure 7:
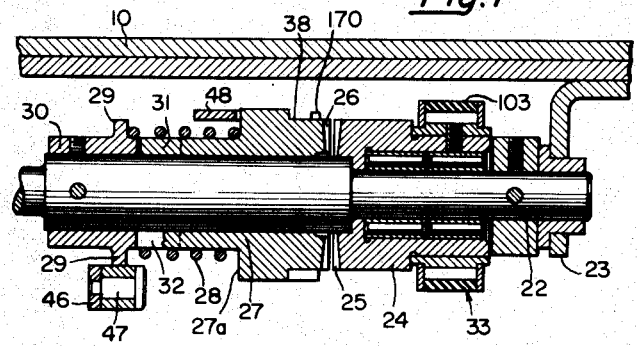
FIG. 7 is a detail section view on line 7—7 of FIG. 4.
Figure 6:
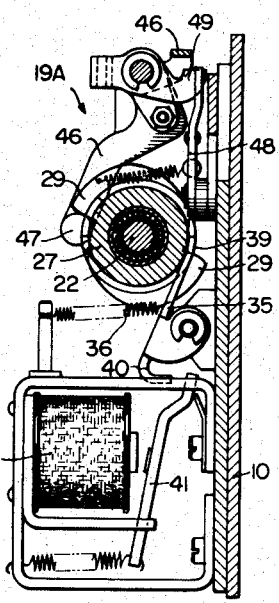
FIG. 6 is a section view on line 6—6 of FIG. 4.

The casing 9 of the multiplier unit houses a plurality of selecting and multiplying components comprising the two major functional units mentioned above and designated as the partial products shifter (FIG. 3), and the function table (FIG. 2). The shifter essentially consists of three printed circuit disks, as follows: right hand shifter disk 62; left hand shifter disk 73; and auxiliary control disk 72. The function table essentially consists of three, printed circuit disks as follows: right hand function table disk 50; left hand function table disk 128; and function table auxiliary disk 58. The disks are actuated by circuit controlled clutches of the half revolution type, such as shown in the Hanstein et al. application identified above by Serial Number 677,541, and in this instance there are four such clutches, here identified on FIG. 1A as 19A, 19B, 19C and 19D, all generally of like construction, so clutch 19A shown in detail in FIG. 4 will be taken as illustrative of all. However, clutch 19A differs in one particular from the others by including a means for delaying the opening of the clutch solenoid prematurely with respect to related functions, as will be more fully described hereinafter. Referring to FIGS. 4, 6 and 7, the clutch unit is shown connected to drive a gear 20 keyed to a component shaft (69) and in mesh with a worm gear 21 on a clutch driven counter-shaft 22 which is supported in end bearings 23. Like parts in the other clutch units will be identified by like reference numbers plus the clutch letter.

The clutch is like that shown in the above identified Hanstein et al. application, Serial Number 677,541, and comprises a roller bearing mounted driving clutch member 24 freely rotatable on the counter-shaft 22 and having clutch teeth 25 juxtaposed for meshing relation with clutch teeth 26 on an axially slidable sleeve 27, which is normally biased to clutch engaging position by a compression spring 28 compressed between an enlarged portion 27a of sleeve 27 and cam lobes 29 of a bushing 30, which latter is pinned to the countershaft 22. The bushing 30 is driven by the sleeve 27 through a square tongue 31 (FIG. 8) fitting a square socket 32 in the juxtaposed end of bushing 30. Clutch member 24 is continuously driven by a pulley and drive belt 33, from a source of power, in this instance, a shaft 34 extending the length of one side of the unit, see FIG. 1A, and connected to suitable drive means, shown in FIGS. 1B and 1C, and described hereinafter.

Figure 8:
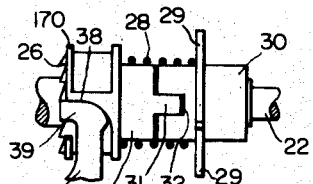
FIG. 8 is a detail view of the clutch shifter and the related driver member.

The sleeve 27 is held declutched by the camming action of a pivoted dog 35 normally biased by a spring 36 (FIG. 6) toward the periphery of sleeve 27 to lie in the path of two diametrically disposed quadrant cams 38 (FIG. 8) which can successively engage the camming end 39 of dog 35. As shown in FIG. 8, which has been reversed end for end to show the condition more clearly, as long as one or the other of cams 38 seat against the dog end 39, sleeve 27 is held declutched. For releasing the dog 35 to permit clutching drive of sleeve 27, its free end 40 (FIG. 6) is in the path of movement of a clapper 41, which functions as the armature of a solenoid 42 arranged to be energized in the operating cycle and thereby cause clapper 41 to pick up the dog end 40 and release the holding action of the dog 35 whereupon sleeve 27 responds to spring 28 to engage the clutch teeth.

Figure 9:
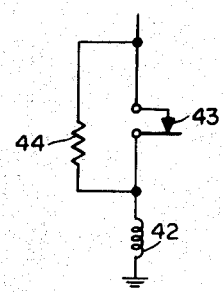
FIG. 9 is a solenoid voltage modified circuit.
Figure 13:
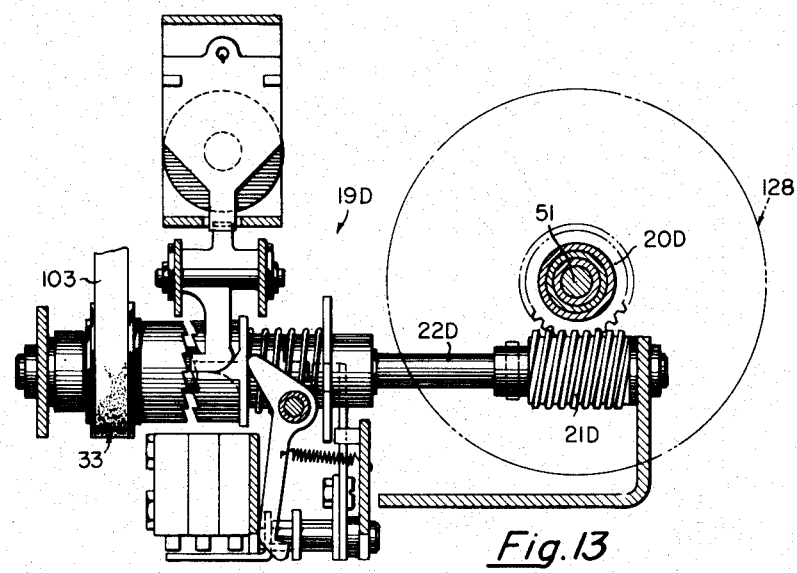
FIG. 13 is a section view on line 13—13 of FIG. 1A.
Figure 14:
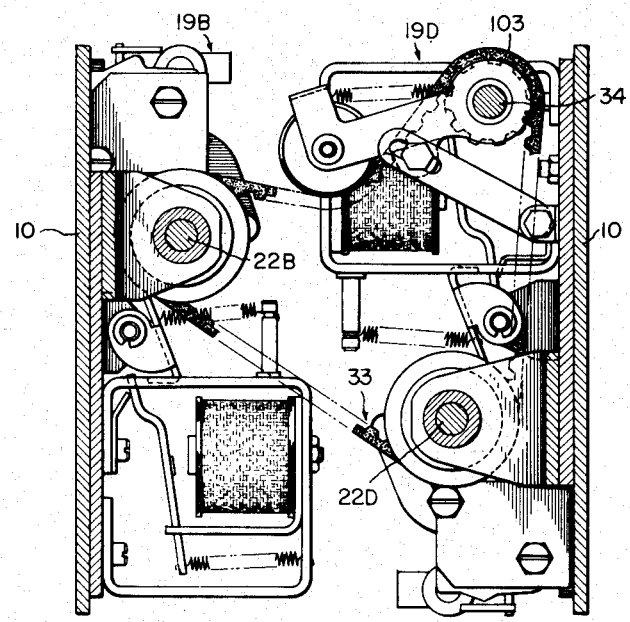
FIG. 14 is a section view on line 14—14 of FIG. 1A showing the clutch drive assembly.

As seen in FIG. 9, solenoid 42 is in a series circuit including a switch 43, such circuit having a resistance 44 as a shunt serving as a voltage by-pass to reduce the solenoid holding voltage following the initial energization. Switch 43 is arranged to be closed by either of the two diametrically disposed cam lobes 29 which are formed as semi-circumferential part of bushing 30 and serve to shift a rock arm 46 by riding under a roller 47 on the free end of the arm 46. A spring biased pivoted bell crank 48 functions to latch switch 43 in closed position by snapping over a detent 49 actuated by the rocking of arm 46. One arm of this bell crank 48 rides against the outer face of the clutch member 27, see FIGS. 7 and 13, while its other arm terminates adjacent the detent 49 which it engages as a latch when the clutch is in engaged position to rock the arm 46 and open switch 43. It should be noted also that rock arm 46 controls, in addition to switch 43, two supplemental switches in each clutch unit for interlocking purposes as will be described hereinafter.

In order to set up a selected digit of the multiplier for a multiplying operation and as seen in FIGS. 2 and 15, the right hand function table disk 50 serves as a "selector." This disk which is of insulating material is keyed to a shaft 51 having keyed thereto gear 20B of clutch assembly 19B meshing with the worm 21B for turning disk 50 when solenoid 42B is energized by an applied pulse.

Figure 28:
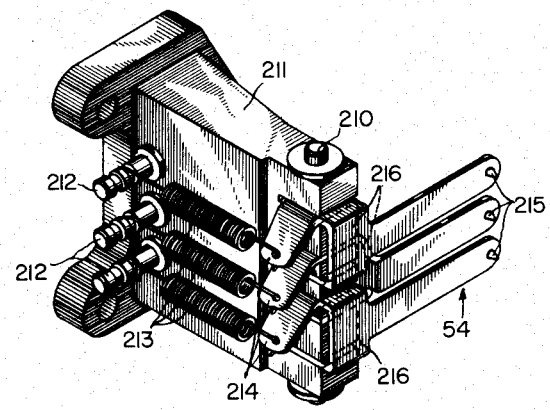
FIG. 28 (on sheet with FIG. 19) is a perspective view illustrative of the circuit wiper contact assemblies.

The control face of disk 50, as seen in FIG. 15, is formed as a printed layer 52 of copper or other conducting material having arcuate isolated segments 53 arranged in staggered concentric relation, to travel under two sets of spring biased wiper contactors 54A and 54B, one for each of the nine busses from the multiplier storage unit, such contactors being identified respectively from 1 to 9, and of the type illustratively shown in FIG. 28. In the present instance these contactors are circumferentially spaced for more compact assembly. Set 54B includes a contactor 55 to ride upon the printed surface 52 for clutch circuit control, and a second contactor 56 as a common return in such circuit for the respective digit contactors. Which contactor 55 or 56 is used depends upon the angular rotation of disk 50, and therefore it is possible for one isolated segment to be used for more than one clutch selecting circuit. In this instance the outer segment has two parts 53a and 53b to coact with either of digit contactors 1 or 7; segment 53c coacts with either of digit contactors 2 or 8; segment 53d coacts with either of digit contactors 3 or 9; segment 53e coacts with digit contactor 4; segment 53f coacts with digit contactor 5; and segment 53g coacts with digit contactor 6. When a circuit corresponding to a particular digit is closed, solenoid 42B for clutch 19B is energized to operate its clutch through worm gear 20B and worm 21B and the shaft 51 is rotated until the disk 50 reaches the segment for the selected digit whereupon that digit contactor rests on its isolated segment to break the circuit and thereby declutch clutch 19B to stop disk 50 in this selected "at rest" position.

This rest position determines the setting of circuit bridge segments printed upon the opposite face 57 of disk 50 (FIG. 16), and arranged as sectors, each of which sectors represents a multiplying table of digits to be connected in circuit closing arrangements in accordance with the set position of the selector. This face 57 of disk 50 will be here designated as the "right hand function table" since it comprises nine multiplying tables, each made up of contacts for the selected multiplying digit. It serves to pass selected answer signals from signal channels to multiplicand digit channels according to the selected multiplier digit.

While disk 50 controls the setting of the right hand function table 57, it also, through the turning of the shaft 51, sets the position of the function table auxiliary disk 58 (FIGS. 17 and 18) which is keyed thereon as a follow-up of the setting of the right hand function table 57 in order to set the "left hand function table." Disk 58 (FIG. 17) has an outer face in the form of a commutator 59 and an inner face (FIG. 18) provided with follow-up contacts 60 and a spider wiper contactor 61 for closing a circuit to energize the solenoid 42D for clutch 19D (FIG. 13) all of which is described in detail hereinafter. The positioning of disk 50 (FIGS. 15 and 16) takes place by pulsing the stored switch of the multiplier with an applied voltage and here using, for example, four as the multiplying digit.

Figure 20:
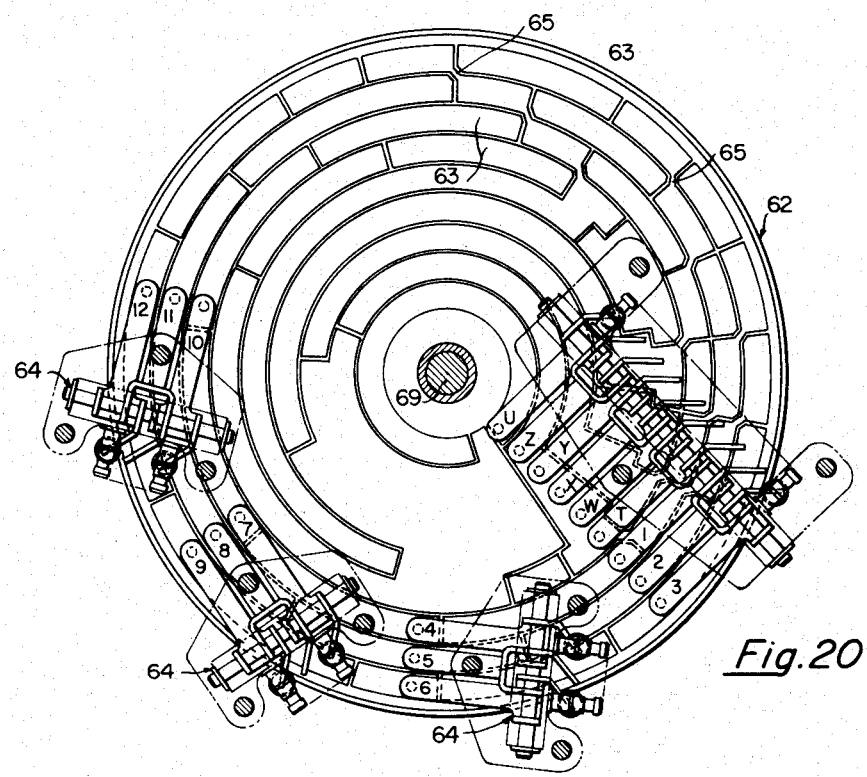
FIG. 20 is a face view on line 20—20 of FIG. 3 of the right hand shifter disk showing the column selector circuit.

In order to position the selected digit in its proper column for registering with the accumulator, the multiplier unit is pulsed from a separate source of voltage to control the setting of the right hand shifter disk 62 (FIGS. 20 and 21) to the correct column for the selected digit. One face of this disk, as seen in FIG. 20, is sub-divided into a series of substantially concentric segmental conductive lanes 63 insulated from each other, each lane segment being of a length circumferentially equal to a column step of the shifter disk. These lanes function as contacts over which spring biased wiper contactors 64 ride for column selection according to columns "1" to "12," so identified on the respective contactors. These again are illustratively of the type shown in FIG. 28, while others of like construction serve for decimal shift selection.

In the present instance, radially considered, the outer three lane contacts are subdivided into isolated segments except in certain locations, as indicated at 65, where they are connected to transfer the circuit from one column to another, but all ride respectively in the path of the spring biased wiper contactors which preferably represent respectively the terminals of the column circuits from the multiplicand unit. Also in this instance the contactors identified as "1" to "12," are arranged in successive groups of three to ride upon the three outer circumferentially positioned lanes. The decimal locating contactors, in this instance the four identified as W, X, Y, Z, ride respectively upon four inner circumferentially positioned lanes and are radially located between two wiper contactors "T" and "U," of which the "T" contactor forms a terminal of the circuit for clutch "A," for initial energizing of that clutch, while the "U" contactor functions for the round-off circuit to be described later. The segmental outer lanes respectively serve as portions of the column selecting stepping circuits.

Figure 21:
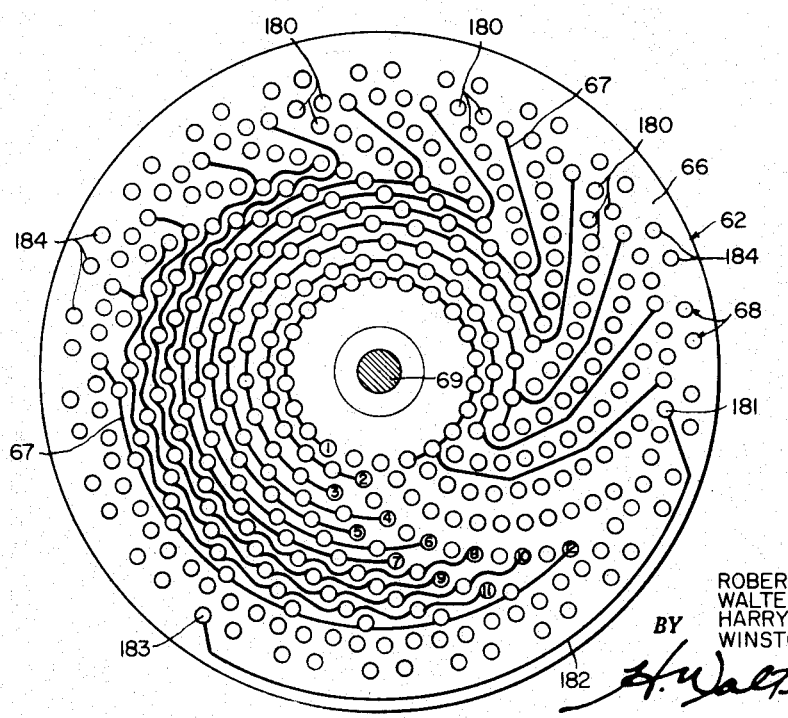
FIG. 21 is a face view on line 21—21 of FIG. 3 of the right hand shifter disk showing the branch circuits for column routing of signals for the right hand components.

The opposite face 66 of disk 62, as seen in FIG. 21, is formed with substantially concentric circuit bridging branches 67 for selectively closing column circuits corresponding to the selected multiplying digit of the right hand function table 57, whereby the right hand components of the partial product are shifted to the correct columns of the accumulator. These selected circuits are defined by circular rows of contacts 68 for transferring the proper partial product to the accumulator and also providing for the selection of any one of four different decimal shifts and for round-off. Disk 62 is keyed or otherwise fixed to a shaft 69 (also see FIG. 3) extending transversely of the unit parallel to shaft 51 and, like shaft 51, is clutch controlled through the energizing of solenoid 42 of clutch 19A (FIG. 4) by closing of the selected circuit to operate the clutch. The drive of clutch "19A" is transmitted by countershaft 22, worm 21, meshing with gear 20 on shaft 69, such assembly being the same as that already described in connection with shaft 51.

Figure 22:
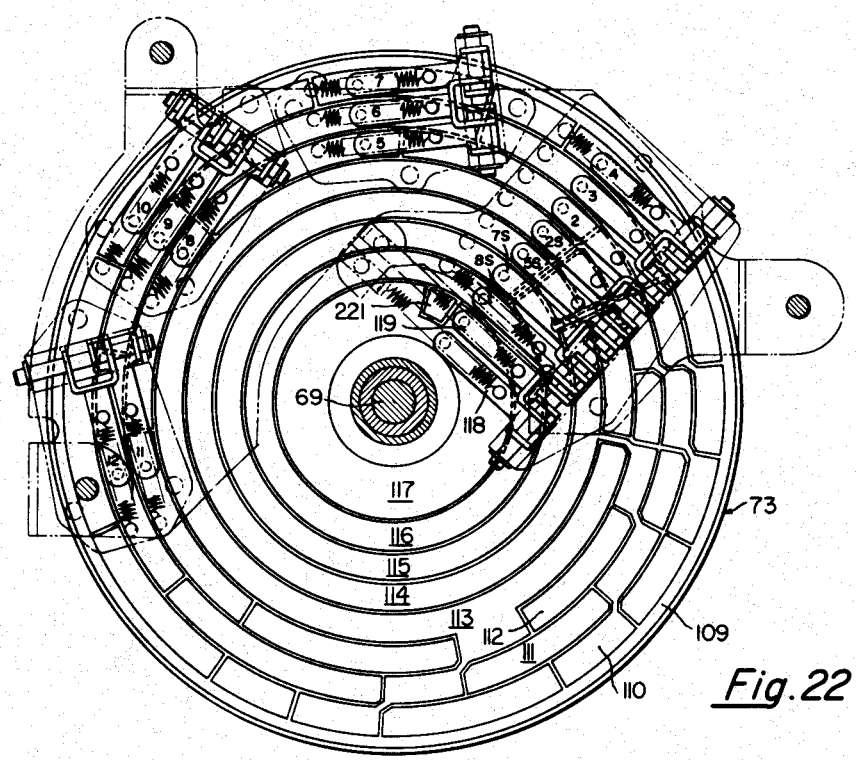
FIG. 22 is a face view on line 22—22 of FIG. 3 of the left hand shifter disk showing the column selector circuits.
Figure 23:
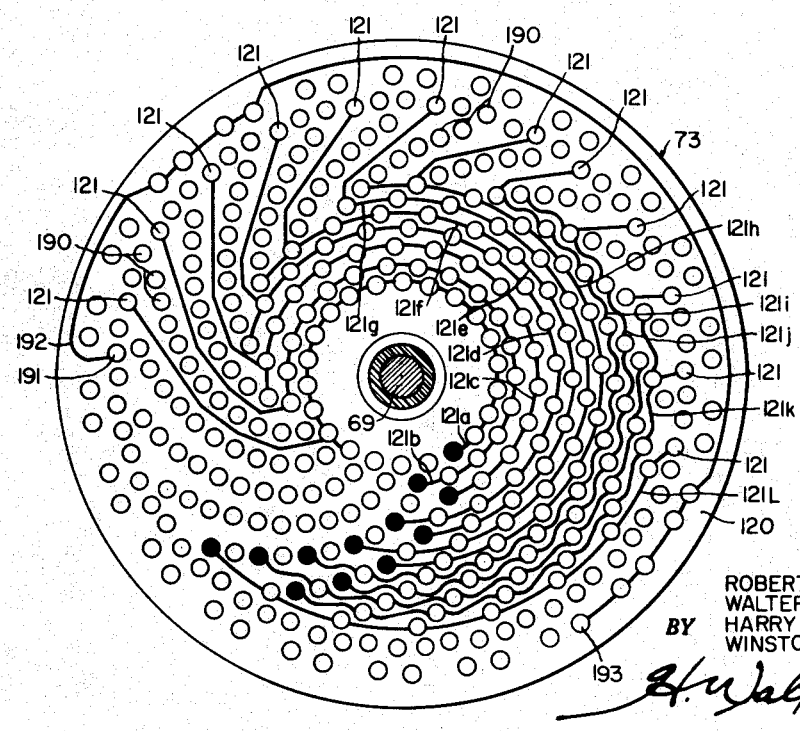
FIG. 23 is a face view on line 23—23 of FIG. 3 of the left hand shifter disk showing the branch circuits for column routing of signals for left hand components.

The opposite end of shaft 69 mounts the follow-up auxiliary control disk 72 (FIGS. 24 and 25) keyed thereto and functioning as a means for setting the left hand column circuit shifter disk 73 (FIGS. 22 and 23). Disk 72 has an outer printed face (FIG. 24) of conducting material subdivided into five concentric electrically isolated conducting ring contacts 74, 75, 76, 77 and a two-part outer circumferential contact 78. Contacts 74 and 75 function as a commutator riding in the path of two spring pressed wiper contactors 81 and 82, respectively, forming terminals of a solenoid controlling circuit. The commutator contact 74 is formed with an outwardly disposed radial leg 84 in electrically conductive relation to a terminal contact 86 on the inner face of the disk (FIG. 25) by a conducting pin 85 which passes through the disk. Commutator contact 75 has an inwardly disposed radial leg 88 conductively connected to a second terminal contact 90 on the inner face of disk 72 by a conducting pin 91 which passes through the disk. Pins 85 and 91 are offset from the path of contactors 81 and 82, thus to prevent damage thereto as the contact surfaces pass thereunder. Terminal contacts 86 and 90 are arranged concentrically on the inner face of disk 72 with shaft 69 as an axis and are insulated one from the other. Contact 86 also includes a continuous outer convolution 86a, while contactor 90 has two diametrically opposite notches 92 and 93, through which portions of contact 86 pass to interconnect the inner portion with the outer portion thereof.

Figure 25:
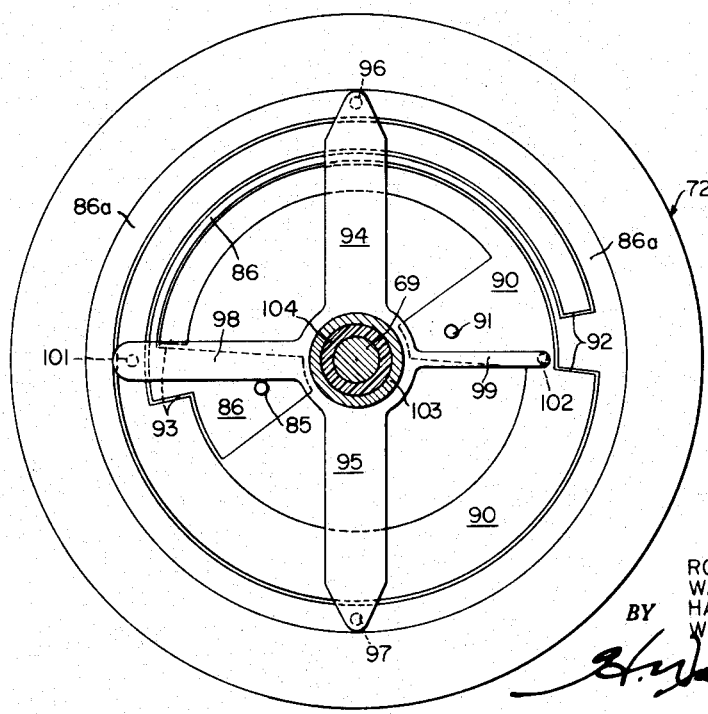
FIG. 25 is a face view on line 25—25 of FIG. 3 of the auxiliary control disk showing the left hand follow-up commutator.

As seen in FIG. 25, the contactors for the two contacts 86 and 90 are carried by a common conductor in the form of a spider having two aligned radial arms 94 and 95, respectively, terminating in wiper contactors 96 and 97 riding upon contact 86a, and two radially aligned arms 98 and 99, normal to arms 94 and 95. Arm 98 terminates in a wiper contactor 101 riding on the outer portion of contact 90 and another wiper contactor 102 on arm 99 riding on the inner portion of contact 90. Due to the radial differences of the contacts arms 98 and 99 are dimensioned to compensate for such difference to maintain equal contact pressure.

Figure 3:
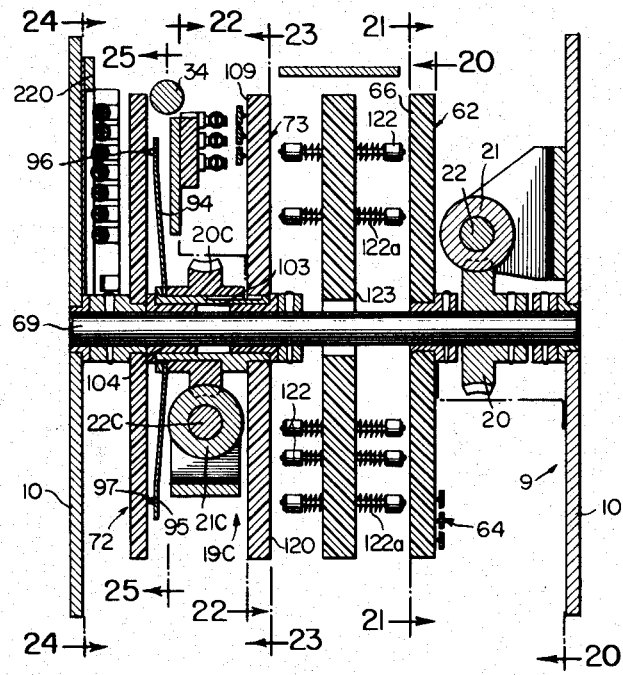
FIG. 3 is a section view on line 3—3 of FIG. 1A.
Figure 4:
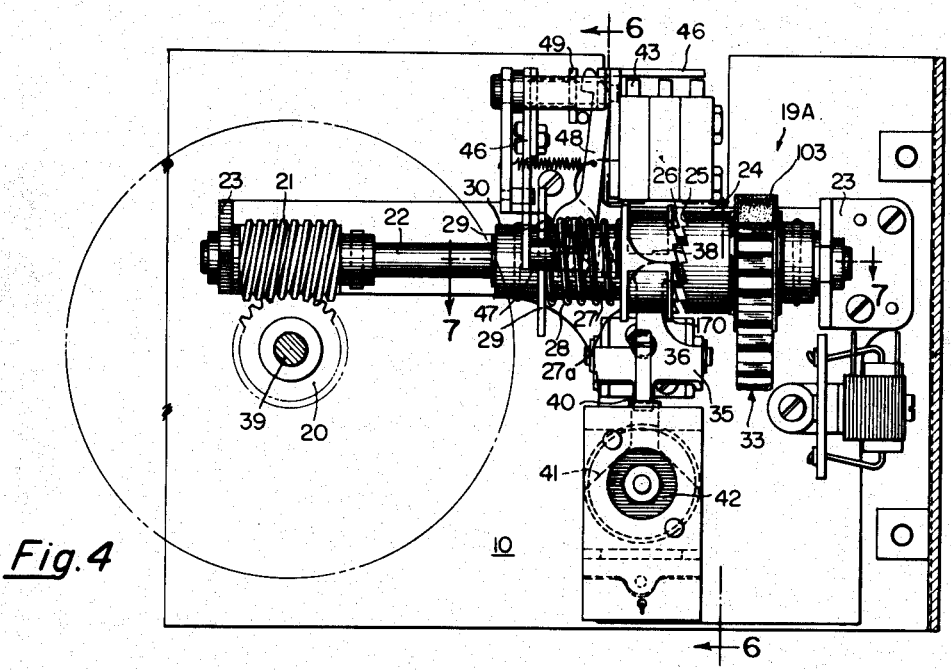
FIG. 4 is a section view on line 4—4 of FIG. 1A, showing a clutch assembly.
Figure 10:
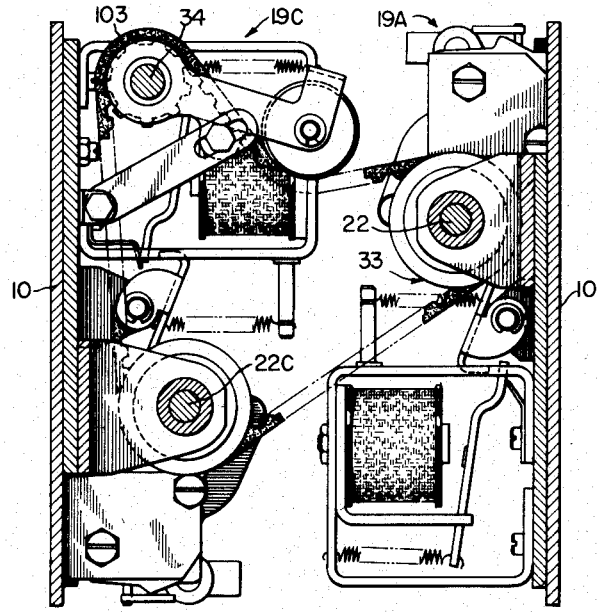
FIG. 10 is a section view on line 10—10 of FIG. 1A.
Figure 12:
FIG. 12 is a detail section view on line 12—12 of FIG. 11.

The spider, as shown in FIG. 3, has a hub 103 keyed to a sleeve 104 which is freely rotatable on shaft 69 and the left hand shifter disk 73 is keyed thereon for rotation with hub 103. The hub is formed with a worm gear 20C in mesh with a gear 21C on a counter shaft 22C for operation by clutch 19C controlled through the energizing of its solenoid 42C through the closing of commutator contacts 81 and 82 (FIG. 24) by the spider contactors. A common belt 108 (FIG. 10) drives clutches 19A and 19C from the drive shaft 34 (FIG. 1a).

Figure 26:
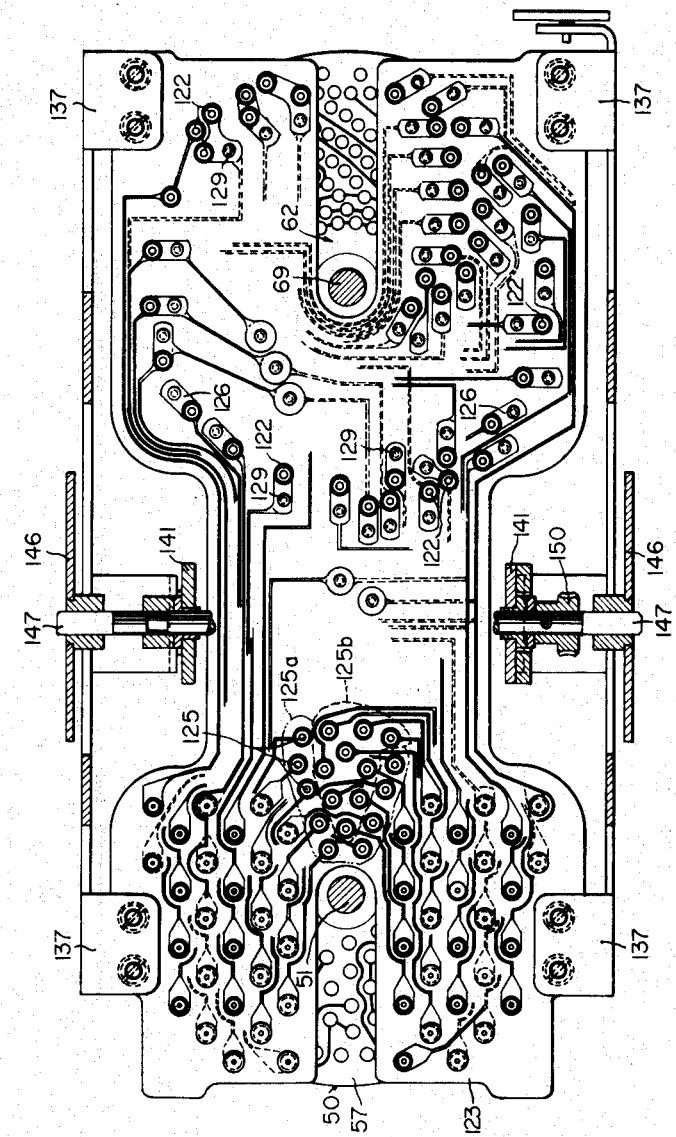
FIG. 26 is a section view on line 26—26 of FIG. 1A showing the platen.
Figure 30:
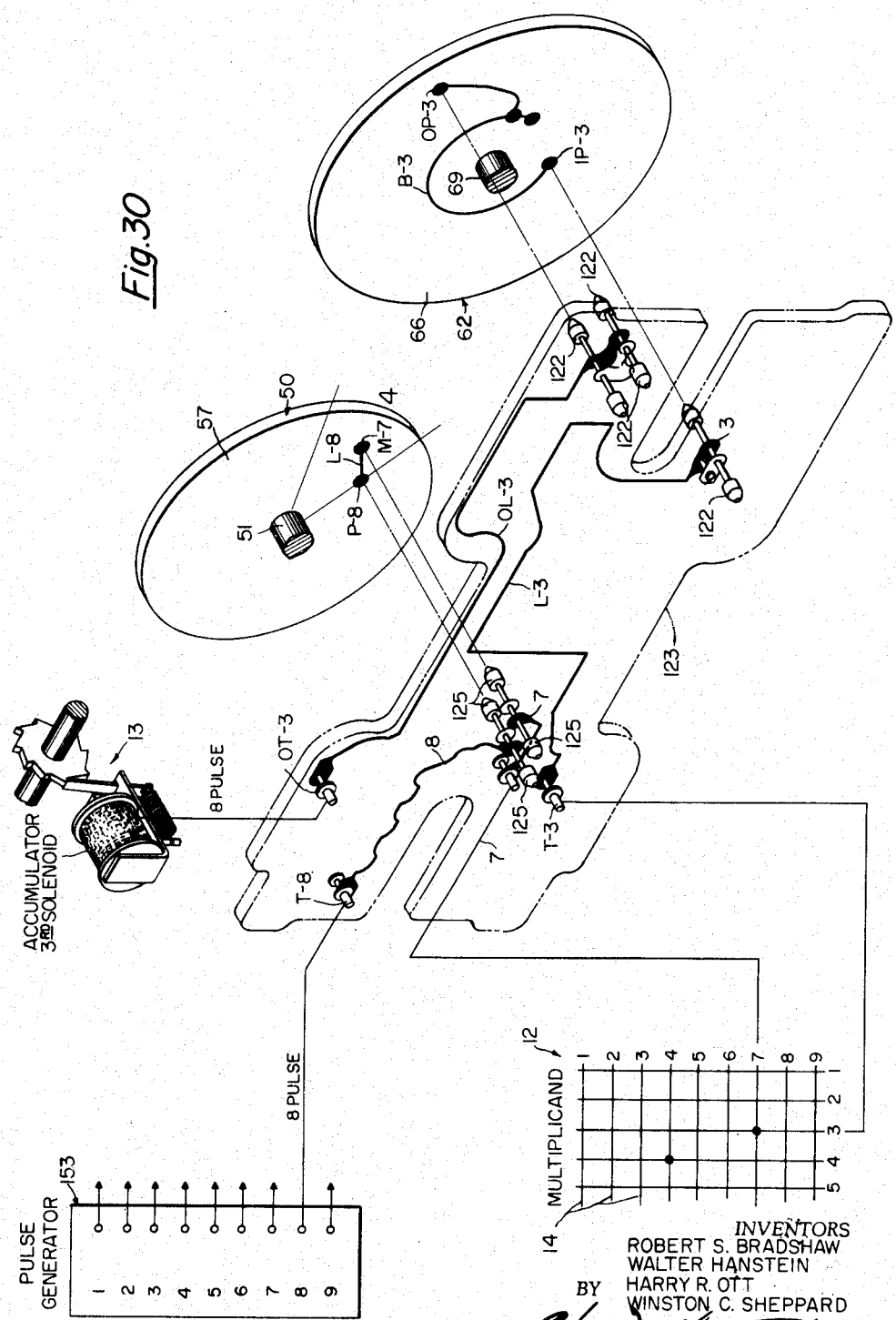
FIG. 30 is a schematic view partially in perspective tracing a pulse selection and routing of the signal from the pulse generator through right hand function table, platen, multiplicand, storage unit, column shifter, back to the platen and then to the accumulator.
Figure 34:
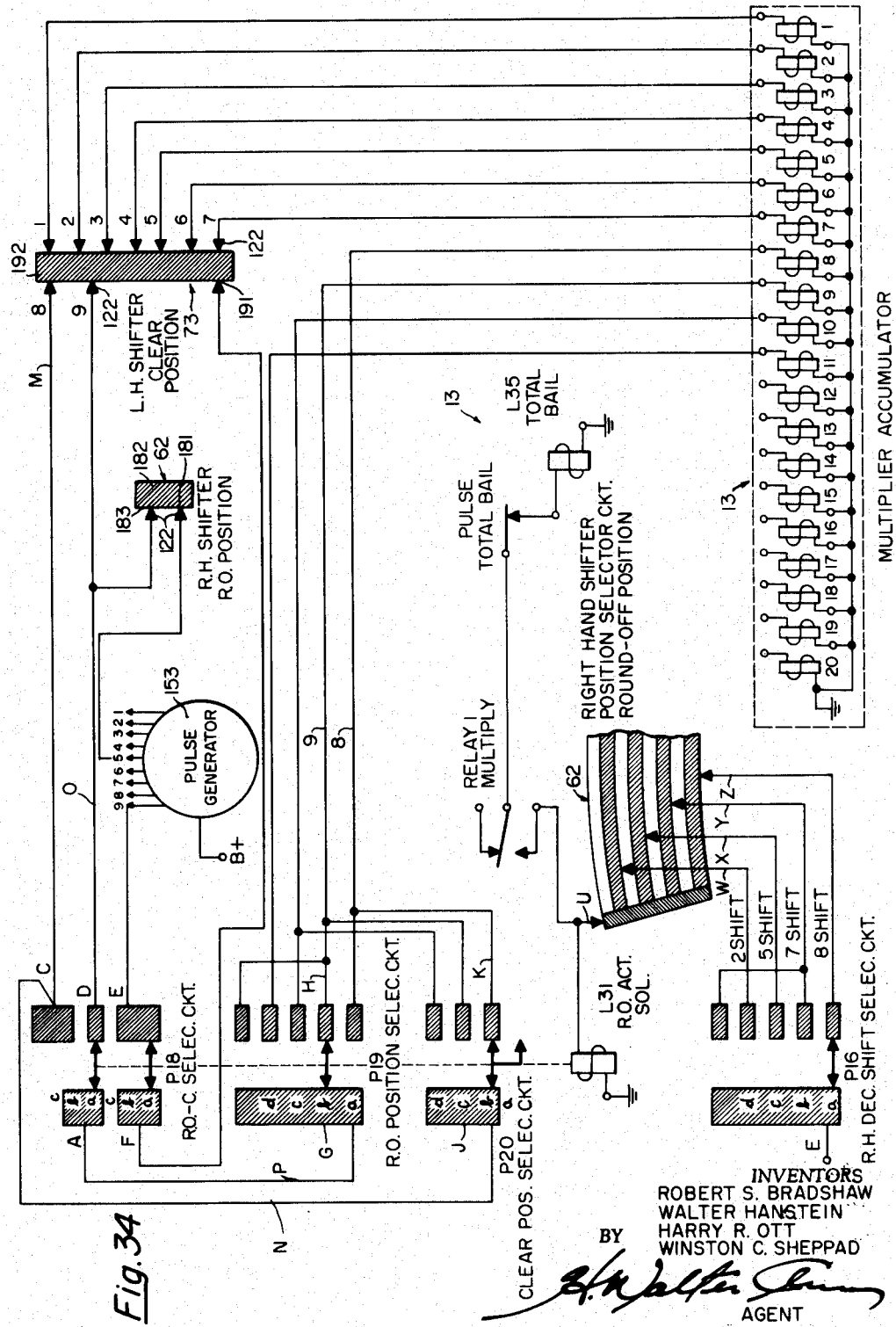
FIG. 34 is a diagram schematically tracing the round-off control as associated with the decimal shift selection.
Figure 35:
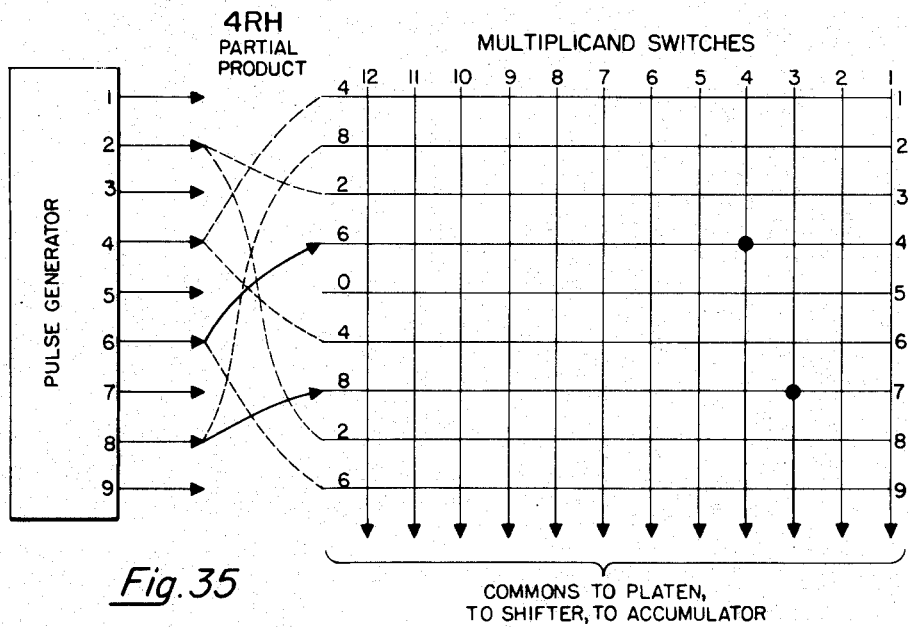
FIG. 35 is a schematic showing of the pulse generator and multiplicand storage unit with switches set for the example problem for tracing pulse selection for the right hand component of the partial product.
Figure 36:
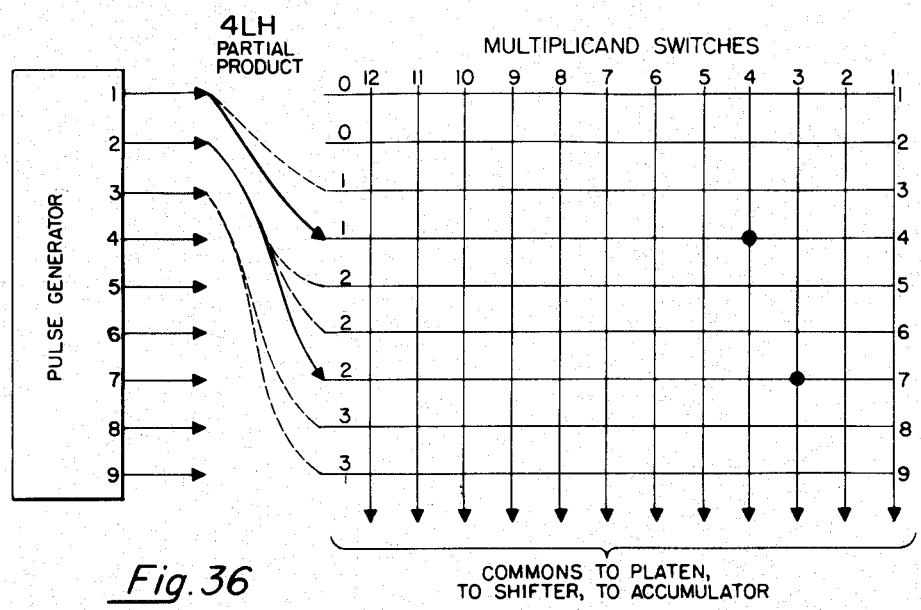
FIG. 36 is a schematic showing of the pulse generator and multiplicand storage unit with switches set as in FIG. 35 for tracing pulse selection for the left hand component of the partial product for the example multiplication.

The left hand shifter disk 73 serves to follow-up the positioning of the right hand shifter disk 62 for setting a circuit corresponding to the selected multiplier digit but one column step ahead (to the left). The outer or colum selecting face 109 (FIG. 22) of disk 73 is formed with a plurality of concentric ring contacts comprising three isolated segmental contact lanes 110, 111, 112, to ride under three rows of spring biased wiper contactors, three to a row, representing respectively circuit terminals for columns "2" to "10," and an extra row of two contactors representing respectively circuit terminals for columns "11" and "12," as identified. The ring contacts 113, 114, 115 and 116 ride respectively under a row of four biased wiper contactors 2S, 5S, 7S and 8S for decimal shift selection, while the innermost ring contact 117 rides under a pair of contactors 118 and 119, the purpose of which is explained hereinafter. All of the wiper contactors are supported in fixed positions radially by suitable brackets shown in broken lines on FIG. 22. The other face 120 (FIG. 23) of disk 73 is formed adjacent its outer edges with a circumferential row of output contacts 121 forming terminals to the accumulator of twelve substantially concentric and arcuate circuit branches about the shaft 69 as an axis, and numbered 121a through 121–L on FIG. 23. The first of a plurality of input contacts on each of these circuit branches are represented by the heavy black dots on this figure, and correspond respectively to the twelve column commons of the multiplicand (FIGS. 35 and 36). The input contacts are arcuately staggered to bring each into juxtaposed relation with spring pressed double ended contactors 122 as circuit terminals projecting as a group through the right hand end of a shiftable platen 123, see FIG. 26, and serving to transmit the selected partial product component into its proper column of the accumulator (FIGS. 30 and 34). The ends of contactors 122 on the opposite face of platen 123 provide circuit terminals arranged to bridge circuits through the right hand shifter disk 62 of the accumulator when shifted into contact therewith. Another group of similar contactors, identified by the numeral 125, are positioned at the other or left hand end of the platen as seen in FIG. 26, the purpose of which is explained hereinafter.

Figure 27:
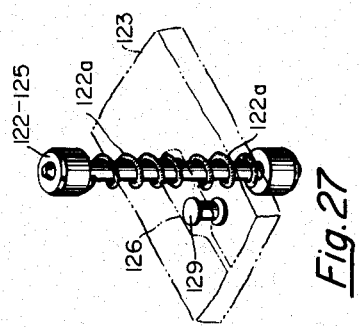
FIG. 27 is a detail perspective view showing one of the platen double-end contactors.

One of the double ended contactors of either group 122 or group 125 is shown in FIG. 27 as an example of the construction of all. The contactors are maintained in good contact relation at all times with printed conducting areas 126 at opposite sides of platen 123 by means of biasing springs 122a positioned around the conducting shanks on each side of the platen. A terminal rivet 129 is positioned adjacent certain of the spring contactors and extends through the platen to electrically connect the two areas 126 on opposite sides thereof. Consequently there is always good contact between the contactor shank and a source of voltage connected to the printed wiring.

For completing circuits from the signal channels through the right hand function table 57 (FIG. 16) to the multiplicand switchbank (FIG. 35), and then to the righ hand shifter 62 (FIG. 20), the platen 123 (FIG. 26) has the plurality or group of double ended spring pressed contactors 125 arranged in two groups 125a and 125b of nine contactors each (encircled by broken lines) as input and output terminals respectively, disposed in juxtaposed relation respectively to the printed sector circuits of the right hand function table 57 at one side of the platen, and likewise disposed in juxtaposed relation to the opposed printed circuit face 127 of the left hand function table disk 128. Each printed sector of the right hand function table 57, see FIG. 16, comprises two groups of nine contacts each, one group representing digits "1" to "9" as inputs for pulse signals, as will be later described, and the other group forming outputs of digits "1" to "9" to the contactors 125a and 125b and then respectively to the busses 14 of the multiplicand switchbank (FIG. 30). Returning now to FIG. 16 it is seen that branch circuits connect pairs of digit contacts according to the multiplier digit selected for the multiplication. It should also be noted that the two lines of radial contacts, respectively defining the sectors, serve dual purposes in that each can be used with its adjoining sector.

Since in the present example, the right hand function table is set for multiplying by "4," this "4" sector has its pulse signal inputs and multiplicand digit channel outputs indicated respectively on the drawing by the letters "P" and "M" with the accompanying digit number. Also in this sector "4" and according to the present digit multiplying example, only pulse input contacts 6P and 8P can find paths through the multiplicand busses 14 because, in the first instance the closed stored digit switch is in the fourth buss and fourth column, and in the second instance the closed stored digit switch is in the seventh buss and third column. Hence, in the problem of 24×47.00 multiplying 4×4, the right hand component is "6" and multiplying by 4×7 the righ hand component is "8," see FIG. 30. No other paths for pulses have closed circuits since there are no other stored switches.

Figure 19:
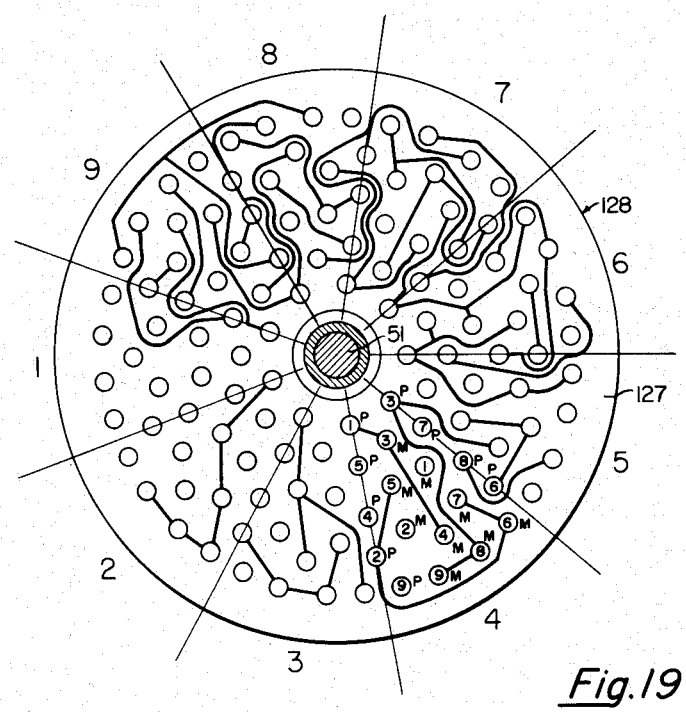
FIG. 19 is a face view of the left hand function table disk showing its printed circuits, taken on line 19—19 of FIG. 2.

Each printed sector of the left hand function table 127, see FIG. 19, comprises two groups of nine contacts, one group respectively representing digits "1" to "9" as inputs for pulse signals by way of the positioned contactors 125a (FIG. 26) and the other group forming outputs of digits "1" to "9" to other positioned contactors 125b leading respectively to the busses 14 of the multiplicand. Branch circuits connect pairs of digit contacts according to the multiplying digit selected by the righ thand function table selection disk 50. Like the right hand function table (FIG. 16) the two lines of radial contacts in FIG. 19, respectively defining the sectors, serve dual purposes in that each can be used with its adjoining sector. Since in the present example, this left hand function table has been set by its follow-up for multiplying by four, the "4" sector thereof will have its pulse inputs and multiplicand outputs indicated respectively on the drawings by "P" and "M" with the accompanying digit number. Also in this sector, "4," only pulse input contacts 1P and 2P can find paths through the multiplicand busses 14 because the closed switches are respectively in busses four and seven, so multiplying 4×7 the left hand component is "2" and multiplying 4×4 the left hand component is "1."

The positioning of the left hand function table 128, still FIG. 19, is determined by the digit selected position of the right hand function table 57 (FIG. 16) as a follow-up of such positioning and for this purpose disk 128 is keyed to a sleeve 130 (FIG. 2) which is freely rotatable on shaft 51, but with a gear 20D keyed thereon. Gear 20D meshes with a worm 21D on a countershaft 22D to be clutch-controlled by the solenoid 42D which is arranged to be energized by the closing of a follow-up clutch circuit initiated by the positioning of the commutator disk 59, see FIG. 17, for closing the clutch circuit by the spider contactor 61 (FIG. 18). This commutator 59 and spider 61 assembly functions similarly to the follow-up assembly of the disk 72 (FIGS. 24 and 25) heretofore described.

Figure 1B:
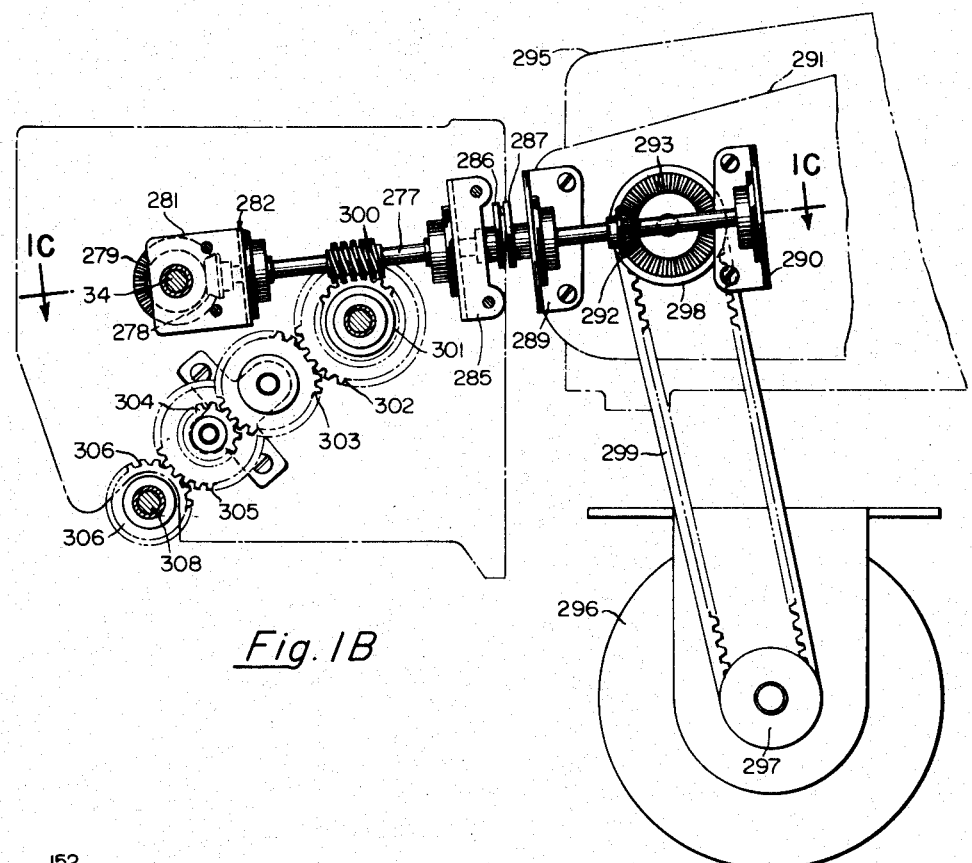
FIG. 1B is a sectional view taken along line 1B—1B of FIG. 1C and shows the drive means for the multiplying unit of the machine.
Figure 1C:
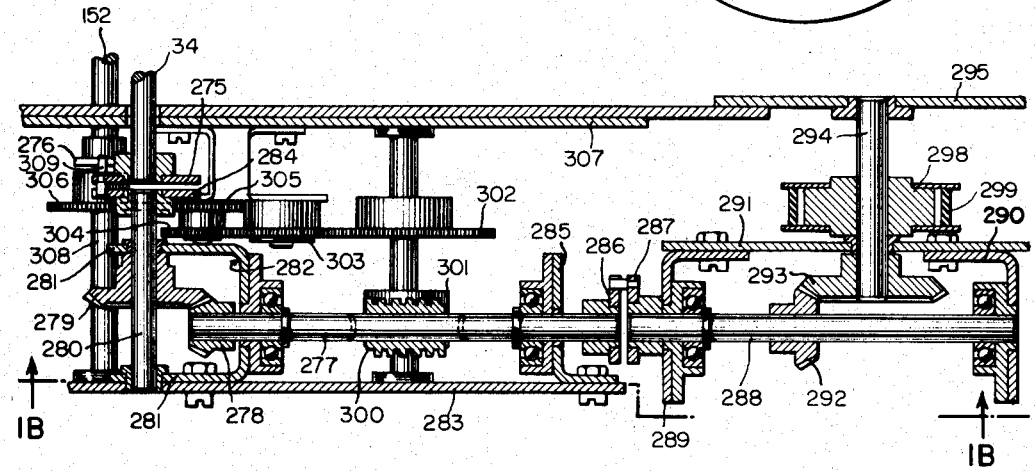
FIG. 1C is a sectional view taken along line 1C—1C of FIG. 1B.
Figure 11:
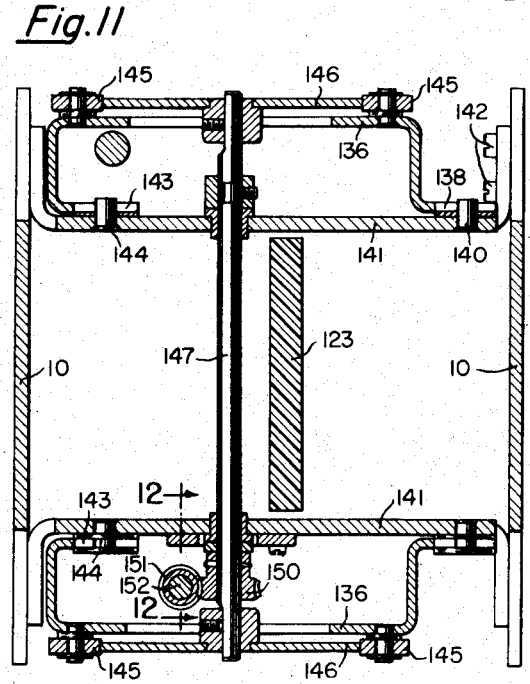
FIG. 11 is a section view on line 11—11 of FIG. 1A.

In order to shift the platen 123 from one contact circuit closing position to another, two shifting yokes 136, see FIGS. 11 and 26, are attached respectively to the top and bottom edges of the platen 123 by two pairs of stud fastened brackets 137. Each yoke 136 at one side has an offset with a bifurcated end 138 straddling a pin 140 projecting outwardly from a plate 141, which latter extends transversely from one side of the casing 10 to the other for attachment to the casing by studs 142. The opposite side of each yoke 136 also has a reversely bent bifurcated end 143 straddling a pin 144 projecting outwardly from plate 141. Thus the two yokes 136 are free to slide relative to the supporting plates 141 and shift the platen in a selected direction. This shifting of yokes 136 takes place through the medium of two pairs of cam operated rollers 145 pivotally mounted on the respective yokes 136, one pair to each yoke and spaced diametrically to ride upon a cam 146 in straddling relation. These cams 146 are keyed to a shaft 147 journalled in suitable bearings in plates 141, and driven by a gear 150 keyed to shaft 147 in mesh with a worm 151 on drive shaft 152. This latter shaft 152 extends partially lengthwise of the unit to project at one end (see FIG. 1A) for connection to a source of power, as seen in FIGS. 1A, 1B and 1C, and described hereinafter.

In order to energize selected circuits through the medium of the platen 123, contactors 125a and 125b, which are located for circuit closing selection for the right and left hand function disks 50 and 128, are arranged in an array of eighteen spaced contactors, nine of which (125a) are numbered from "1" to "9" respectively, connected by busses numbered "1" to "9" to serve as voltage outputs from a pulse generator 153, see FIGS. 30 and 34. The nine contactors 125a also function respectively as signal inputs to the circuitry as set up by the right and left hand function table selectors 57 and 127. The remaining nine contactors 125b, also numbered "1" to "9," are respectively connected to input busses 14 leading to the nine digit rows of the multiplicand switch bank 12. Thus for one set of nine contactors 125a number "1" contactor is connected to pulse output "1"; number "2" contactor is connected to pulse output "2," and so on throughout the nine contactor series. For the second set of nine contactors 125b, number "1" contactor is connected to input buss 14 leading to digit row "1" of the multiplicand switch bank 12; contactor "2" is connected to its input buss 14 leading to digit row "2" of the switch bank 11, and so on throughout the second nine contactor series.

For transferring the selected signals coming from the multiplicand switch bank 12 to the correct columns for delivery to the accumulator, that portion of the platen 123, between the right and left hand shifter disks 62 and 72, has the aforesaid double ended contactors 122 projecting from opposite sides thereof. Twelve of these contactors correspond respectively to the twelve column commons of the multiplicand, as more clearly set forth hereinafter. These contactors are connected respectively to commons "1" to "12" of the multiplicand (FIG. 35) and serve as inputs to the accumulator, and function for proper registration with the twenty accumulator columns according to the decimal setting.

As heretofore described the platen 123 is shiftable from a neutral non-contact position, as seen in FIGS. 2 and 3, to engage one pair of disks at one side thereof for one half cycle, return to neutral position, then shift to engage the other pair of disks for another half cycle, and finally return to its neutral position ready for another multiplier selection. The contour of the dual operating cams 146 (FIG. 11) is such as to effect these successive operations. In this connection it should be noted that when platen 123 contacts the right hand shifter disk 62 and the right hand function disk 50 the former disk has been set for the proper column to correspond to the selected digit of the latter disk. Also the turning of these disks predetermines the follow-up positions of the left hand function table 128 and left hand shifter 120 for engagement by the platen contactors when the platen shifts to contact this pair of disks for left hand component selection.

Figure 29:
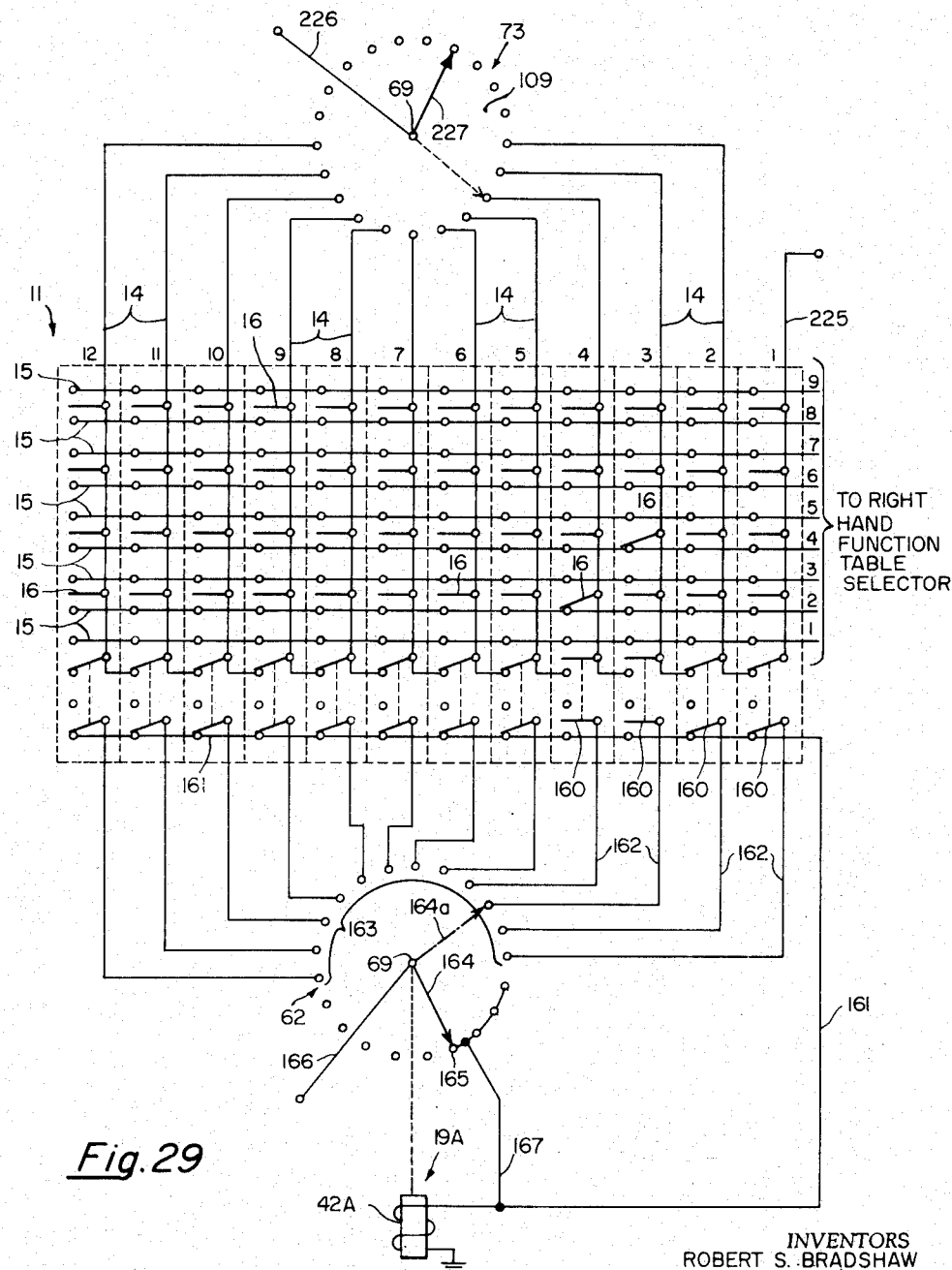
FIG. 29 is a schematic showing of the circuit and digit-or-zero switches for digit column selection.

In order to select the digit for the right hand function table selecting disk 50 reference is made to FIG. 15 where the spring pressed wiper contactors "1" to "6" are shown mounted in a radial row on a bracket supported insulated rod 154 in circumferential alignment with the respective disk isolated insulating segments 53, while the spring pressed wiper contactors "7" to "9" and common contactors 55 and 56 are mounted in a radial row on a bracket supported insulated rod 155. These contactors "1" to "9" terminate respectively in connectors 156 serving respectively as terminals of the outputs of digits "1" to "9" from the multiplier storage switch bank 11 (FIG. 29). The wiper contactors 55 and 56 terminate in connectors 157 having a common lead to the solenoid 42B of clutch 19B.

For a complete understanding of the digit and digit column selection it will be understood from the aforementioned Jones et al. patent application that the multiplier switch bank 11 (FIGS. 1 and 29) is made up, in the present instance, of twelve switch units arranged side by side, each unit having a row of switches 16 representing digits from "1" to "9," with each number switch arranged in the common buss of that row of digits of all the units. Also each unit has a supplemental row of zero-or-digit switches 160 for column selection of the digit stored by a selected switch 16. Since the coded rack bars 17 controlled by the tabulating machine respectively reciprocate below the switch units of the switch banks 11 and 12, see FIG. 1, the digit and column selection takes place by a coded lug 17a on the rack bar which closes the switch 16 for the required digit, while the other switches in that column remain open. Where the problem is 24×47.00 and assuming the tabulator has coded the digit "4" by closing a switch 16 in the multiplier bank 11, and also opening the switch 160 for the proper column, a signal from a voltage source 225 (FIG. 29) then closes the solenoid circuit through contactor "4," disk face 52 and contactor 55 (FIG. 15), whereupon clutch 19B is actuated to turn the right hand function table selector disk 50 until the contactor "4" rides onto the corresponding segmented isolated lane 53e, whereupon the solenoid 42–B for clutch 19B is deenergized to de-clutch the drive so that the disk 50 is stopped in set position for the selected multiplication. The position of the "4" sector of the right hand function table 57 (FIG. 16) is now in position for multiplying by the digit "4." While the digit is being determined, it is also being located in its correct column by the open switch 160.

To make this column selection the digit-or-zero switches 160 (FIG. 29) controlling the right hand shifter commutator of disk 62 (shown in FIG. 20 and schematically in FIG. 30), position it correctly to correspond to the selected digit. In describing this selection it will be understood that when the coded rack bar 17 of the tabulator (FIG. 1) selects the digit switch, in this instance "4" of the multiplier 24, it also, as explained, opens the digit-or-zero switch 160 corresponding to the column in which this digit "4" is located, in this instance column three.

Referring to FIG. 29 of the drawings, a simplified showing of the selector commutator 62 of FIG. 20 is used for explanation. Here each switch 160 has one terminal connected to a common lead 161 to the solenoid 42A of clutch 19A while the other terminals are respectively connected by leads 162 to contacts 163 on disk 62 arranged in an arc to be swept by a rotor contactor 164 carried by a hub on what corresponds to shaft 69 of FIG. 20. The contacts 163 correspond respectively to the twelve contactors "1" to "12" also of FIG. 20 and define the columns of the multiplier switch bank 11. The rotor contactor 164 has a "Home" contact 165 to close the starting circuit for actuating clutch 19A, such circuit including an input lead 166 from a source of voltage and an output lead 167 from contact 165 to the solenoid 42–A.

In the present example while the digit "4" is being selected, a voltage is applied to the starting circuit which energizes solenoid 42A and starts rotor contactor 164 moving from "Home" position, in the absence of a decimal shift, to contact for column one of the multiplier but since switch 160 is closed the rotor contactor moves on step by step until it reaches the open switch for the column (column 3) in which digit "4" is located, as shown in broken line 164a. At this open switch the circuit for clutch 19A is interrupted and the right hand shifter disk 62 is stopped with the printed circuit sections 63 oriented properly for transferring the particular partial product component to the accumulator. Thus it will be seen that the rotor arm contactor 164 is started by the applied pulse to move step-by-step, wiping the contacts 163 successively until it finds an open switch, which thus means there is a digit in the column controlled by the open switch whereupon the column selecting circuit is broken, the solenoid 42A is de-energized and clutch 19A thus disengaged. In other words, looking lengthwise of the row of zero switches there is either a digit or a zero indicated. Thus with the zero switches coded for the proper column, the rotor arm can travel from one contact to another until the digit-indicating open switch is reached, in this example digit "4" in column three (FIG. 29), whereupon the clutch is disengaged and the right hand shifter disk 62 is stopped in the position corresponding to the selected digit column.

Figure 5:
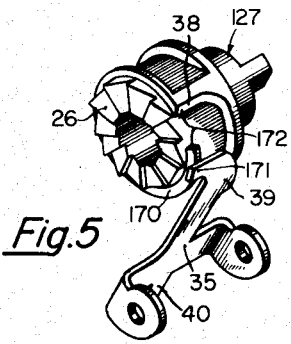
FIG. 5 (on the sheet with FIG. 10) is a detail perspective view of a clutch control for circuit closing delay.

Since switch arm 164 moves step-by-step from one contact to another until an open switch is reached, provision is made for preventing any circuit controlling switch 43, 175 and 176 (FIG. 4) from opening prematurely and thus signalling it is time for the beginning of the next digit column selection. To delay the control switch operation, sleeve 27 of the clutch 19A is formed with a circumferential flange 170 (see FIG. 5) as a riding support for a finger 171, which projects laterally from the solenoid controlled dog 35, so that the latter is prevented from dropping to release the clutch shift sleeve 27 until the finger 171 comes into register with a slot 172 cut in the periphery of flange 170. The length of this slot 172 is relatively short so even though the solenoid 42A has been deenergized it is almost immediately re-energized because the rotor arm 164 has reached the next succeeding contact. This interval of delay is sufficient to prevent the control apparatus from misguiding the controls into operation before the instant step has been completed. Also by delaying the de-clutching unit there is no upsetting of the desired rapid transfer of a partial product component to the accumulator.

It will be understood during the positioning of the right hand function table 50 (FIG. 2), that its driving shaft 51 has correspondingly turned the follow-up commutator 59 of disk 58 (FIG. 17) thereby to close the circuit of spider contactor 61 (FIG. 18) so that solenoid 42D is energized to operate clutch 19D to turn left hand function table 128 (FIG. 2) and bring its printed circuit 127 (FIG. 19), into register with the sector for digit "4" when it stops opposite contactors 125 of platen 123.

Also during the positioning of the right hand shifter disk 62, its driving shaft 69 has correspondingly turned the left-hand shifter follow-up circuit 72 (FIG. 25) to close the circuit of spider arms 94, 95, 98 and 99 and thereby energize solenoid 42C so that clutch 19C (FIG. 3) rotates the left hand shifter disk 73 through the contact segments of its commutator, and locates its printed circuit (FIG. 23) and its branch circuit contacts accurately with respect to the contactors 122 of the platen 123 according to the setting for digit "4." The declutching of all four clutches means that the digit "4" selection has been completed for both the digit selection and the column in which it is located. In other words, there is an initial time interval during which the initial shift plus the stepping through zeros take place, subject to control by the interlocking switches to prevent starting of the accumulator while the platen is in contact with both the right-hand shifter circuit 66 and the right-hand function table circuit 57 to carry out the first multiplying step. This interlock also prevents the selection of another digit prematurely. During this set-up period, the right-hand shifter disk 62 has turned to the proper column for the right-hand component and is followed up by the delayed turning of the left-hand shifter disk 73. Also the right-hand function table 57 will have turned to establish the circuit multiplying section for digit "4" and be followed by the delayed follow-up of the left-hand function table 127 for the multiplication for the left hand partial product component. It should be noted that each clutch has a switch 43 for shunting its solenoid energizing circuit through a resistor 44, as has already been described, and two interlocking switches 175 and 176 (FIG. 31), functioning in pairs to control the accumulator cycling and disk positioning as will be later explained.

There are four sets of interlocking switches 175 and 176. One switch for each clutch assembly is arranged in a series circuit controlling the operation of the accumulator so that with any such switch open the accumulator does not operate. These switches are normally closed but open successively as each clutch solenoid is energized and in consequence the accumulator cannot start until the pair of right hand disks have been set for the selected multiplication step. Thus, when clutches 19A and 19B operate, during digit and column selection, interlocking switches 175 and 176 for these clutches are opened after which the clutches 19C and 19D for the respective pair of left hand disks open the other interlocking switches 175 and 176. Then as each selection is made, the declutching of the respective clutches closes its interlock switch, so when the appropriate pair is closed the series circuit is closed and the accumulator operates to start the accumulator revolutions to receive the partial product components from the multiplication step.

Now, with both the right-hand shifter disk 62 and right-hand function table 57 in set position, the platen cams 146 are time operated to shift the platen 123 and bring the two sets of contactors 122 and 125 respectively into contact relation with the printed circuits of the two disks 62 and 57 (FIG. 30) as set for the selected digit "4" multiplication so that a multiplying step can now take place and the right hand components of the first multiplier digit be stored in the accumulator.

In describing the multiplying operation, it is still assumed that the problem is 24×47.00 so that the "2" and the "4" will be stored in the respective switches 11 of the multiplier and the "4" and the "7" will be stored in the respective switches 12 of the multiplicand with the former in column four and the latter in column three. As heretofore explained, the multiplier digit "4" has been selected in column three so the right hand function table 57 has turned and been brought to rest with its multiply-sector "4" so positioned that its contacts register respectively with the platen contactors 125 for precise selection of the right hand partial product component which is "8" in the example 4×7. At the same time the right hand column shifter disk 62 has turned to properly register its printed contacts respectively with the contactors 122 for matching the column of component "8" with column three of the accumulator which, in the present problem, corresponds to column three of the multiplicand because no switches are closed in columns one and two.

With the right hand shifter 66 and the right hand function table 57 so positioned, the multiplication of 4×47.00 can now take place to locate the right hand components "8" and "6" in the correct columns for the accumulator. The pulse generator 153 (FIG. 30) now delivers all nine pulses respectively to the "1" to "9" contacts on the left end of the platen 123, see FIG. 26. The remaining contacts "1" to "9" form outputs leading respectively to the nine rows of busses 14 extending across the twelve column commons of the multiplicand switch bank 12. Where any switch of the multiplicand is closed, a path is formed to route a pulse through such switch to the right-hand shifter 62, thus to guide the right hand component into the selected column of the accumulator. In this example, the switches for digits "7" and "4" have been closed respectively in the columns three and four and consequently are ready to complete two pulse circuits corresponding to right hand components "8" and "6." It should be understood that the pulses from the generator 153 increase in length progressively from "1" to "9," as described in Hanstein et al., Serial Number 693,779, identified above, therefore, since buss lines for digits "7" and "4" are closed by the two stored switches, only pulses "8" and "6" (FIG. 35) can find paths through the multiplicand to set up the right hand component of 4×7 or 8, and the right hand component of 4×4 or 6 in their respective columns of the accumulator. From FIG. 35 the foregoing multiplication for the right hand partial products, where "4" is used as the multiplier, can be traced from the pulse generator through the multiplicand switch bank to the outputs leading to the appropriate column of the right hand shifter disk. With "4" as the multiplier, the right hand components are shown in the path of pulses from the pulse generator, but only pulses 2, 4, 6 and 8 can give the correct right hand component where the multiplier is four. In this example pulse 2 has no path through either buss for 3 or 8 to give a 3 component; pulse 4 has no path through either buss 1 and 6; pulse 6, however, finds a path through buss 4, because of its closed switch in column four, to complete the multiplication for the right hand component, namely the "6" of 4×4. Pulse "6" also has a path to buss 9 but this is open by the absence of a stored switch. Pulse 8 has two paths, one by buss 2 and the other by buss 7, but only the latter has a stored switch and thus the multiplication is effected for the right hand component, namely the "8" of 4×7 which is located in column three. It should be understood in considering the foregoing that there are intermediate paths for the pulses by way of the platen 123, and FIG. 30 traces the above pulse 8 in detail as described now.

For completing the multiplication, cams 146 now shift platen 123 to bring eighteen of the contactors 125 against the contacts of the positioned sector of the right hand function table 57 for multiplying by four, where nine of such contactors 125 serve as inputs from the pulse generator and the other nine serve as outputs to the multiplicand, said inputs and outputs being connected in pairs by the function table branch printed circuit leads according to the selected pulse routing. Referring to FIG. 30, pulse "8" will be routed as follows: From the generator 153 to terminal T–8 of the platen, printed lead 8 to contactor 125 to contact P–8 of function table 57, lead L–8 to contact M–7 which is against contactor 125 for 7, then by printed platen lead 7 to buss line 7 of the multiplicand, through the 7 switch, column three to return by a lead to terminal T–3 of platen 123, then by lead L–3 to commons column contact 3 to contactor 122 of the platen, from contactor 122 to contact 1P-3 of the right hand shifter 62 where branch B-3 routes the pulse to output contact OP-3, thence by contactor 122, and printed lead OL-3 lengthwise of the platen to output terminal OT-3 which the shifter has located to route the signal, to energize the solenoid for operating the clutch unit of the accumulator for column three to receive the right hand component "8." It should here be explained (see FIG. 21) that the printed circuit of the right hand shifter 62 is formed with an outer circumferential row of contacts forming output terminals to the contactors 122 of the platen 123 leading to the columns of the accumulator, spaced preferably two contacts apart, of the twelve substantially concentric branch leads 67 having respectively inputs numbered "1" to "12" from the multiplicand which correspond respectively to twelve column commons of the multiplicand. These input contacts are arcuately staggered to bring each to a position to be contacted by the platen output contactor 122 which leads from the multiplicand column commons for the component which has been selected. Each branch lead between its terminals is formed with contacts spaced to register with contactors 122 of the platen 123 whereby any contactors not in a circuit will find a seat on a pad spacer and thereby prevent damage to the printed circuits as the platen reaches contact position. For the same purpose, additional rows of inert pad spacers 180 lie arcuately between each pair of the terminal leads, thereby serving as seats for the spring pressed contactors thus to prevent direct contact with the face of shifter disk 62. Also one of the contacts of the outer circumferential row of contacts, other than those numbered "1" to "12," forms the input terminal 181 of a branch arcuate lead 182 terminating in an output contact 183. A supplemental row of pad spacers 184 is arranged circumferentially in spaced pairs alongside of lead 182. Branch lead 182, its related terminals and adjacent spacers, have to do with the round-off operation which will be described in detail hereinafter.

While the multiplication for pulse 8 is taking place, a like multiplication by pulse 6 for the right hand component of 4×4 is taking place so the pulse for contact "6" of the output array of the nine platen contacts finds its path through the function table but in this routing selects the buss 14 for closed switch digit "4," thence through the multiplicand commons "4" and platen contacts through the right hand shifter 57 and platen to route the signal and energize the solenoid for accumulator column four and so locate the right hand component 6 beside the entry of the right hand component 8. While these two multiplying steps are taking place, the cams 146 are travelling through one-half the cycle to time-shift the platen at the end of this multiplication to move the platen out of contact with the right hand shifter and right hand function table. Therefore, during this transfer interval of the platen it is possible to select another multiplying digit and its column as heretofore described by subjecting the multiplier switch bank 11 to two separate voltages which reset the right hand function table and shifter to correspond to the new multiplying digit.

In explaining the entry of the left hand components of the partial products it is to be remembered that the respective follow-up commutator controlled disks 72 and 58 have brought the left hand shifter printed circuit face 120 to the position for column selection one step in advance of the right hand shifter, and the left hand function table 127 into its position for multiplying by four.

Now that the platen 123 has brought its contactor arrays 125 and 122 respectively into contact relation with the left hand function table 127 and left hand shifter 120, it is now possible to enter the left hand components of the problem 24×47.00. In this example the left hand component of 4×7 is "2" so pulse two finds a closed path by way of a buss 14 to the switch for digit "7" in commons column three, while the left hand component of 4×4 is "1," so pulse one finds a closed path by way of a buss 14 to switch for digit "4" in commons column four.

By reference to FIG. 36 the pulse selection course can be followed for the left hand components of the problem where pulse 1 has a closed path through buss 4 with the stored switch to obtain the left hand component "1" of 4×4. The other path for pulse 1 for buss 3 is open and no multiplication takes place. As seen in the component column there are three busses for pulse 2, representing 4×5; 4×6; and 4×7 but only buss 7 has a stored switch so pulse 2 performs the multiplication for the left hand component, namely "2" of 4× 7. The respective paths for these two pulses are routed through the output contactors 125 of the platen through matching contacts of the left hand function table 127 by the selected circuit branches so the outputs leading to the multiplicand busses return through the platen to the left hand shifter 73 and thence to the respective platen terminals to locate and energize the selected accumulator solenoids to enter the components in the accumulator.

The routing of the left hand components for the respective energizing of the column solenoids of the accumulator is by way of the printed circuit branches 120 of the left hand shifter disk 73 (FIG. 23), wherein circumferential rows of contacts of substantially concentric branch leads 121 having input terminals corresponding respectively to the twelve column commons of the multiplicand for routing the component which has been selected to the accumulator. The output terminals are spaced preferably two contact steps apart. Also each branch lead 121 between its terminals is formed with contacts spaced to register with contactors 122 of the platen 123 whereby those contactors which are not in a routing circuit are held spaced from the face of the disk to prevent damage when the platen meets the face. For the same purpose additional contactor spacing is provided by arcuate rows 190 of inert pad spacers which lie between the branch leads and others as proper locations to seat any spring pressed contactors 122 without direct contact with the face of the disk. Furthermore, one of the contacts of the outer circumferential row, other than numbered "1" to "12" forms the input terminal 191 of a branch arcuate lead 192 with an opposite end output terminal 193. Such branch lead will be explained in connection with the roundoff operation.

Obviously the timing of the platen movement from contact relation respectively with the right hand disks and the left hand disk has to be precice, not only with respect to the two pairs of disks, but also to the operation of the accumulator. For an understanding of the cycle for one multiplier digit it will be understood that at the start of an accumulator revolution the platen has its initial shifting movement to contact the pair of right hand disks. This contact or sensing time permits the pulse generator to function to select the right hand components and enter them in the accumulator. Thus in the present problem 24×47.00, with four as the multiplier, during the platen sensing the right hand components of 4×7 and 4×4, which are "8" and "6" respectively, are generated and entered into the accumulator, whereupon the platen swings back to neutral position preliminary to being moved into contact with the left hand pair of disks. While this transition is taking place there is time to select the digit and column on the right hand pair of disks for the new multiplier which in this instance is two. The platen now is brought into contact with the pair of left hand disks for sensing the left hand components during the next revolution of the accumulator with the result the left hand components of 4×7 and 4×4 which are "2" and "1" respectively are generated and entered, as shown in FIG. 36, by the described pulse selection. The start of the next accumulator cycle will not take place, unless there has been a delay in locating and identifying the next multiplier digit, which delayed start can be provided for by holding release of an interlocking switch.

In considering the foregoing description it will be evident that provision must be made to prevent over-running relation between the right and left hand shifters, between the left hand shifter and the right hand function table, and between the right and left hand function tables, as otherwise any clutch continuing to operate out of timed relation to another results in improper components being entered in the accumulator or a delay in entering the proper component until the tables are restored to synchronization. Another consequence of such over-running is the danger of damage to a printed circuit caused by relative movement between the platen contactors and such printed circuit. While it is common to have spring pressed wiper contactors riding on a printed circuit the present case is different because the platen is cam shifted to bring its pointed contactors against the printed circuits with such pressure that any relative movements of the contacting parts may tend to damage the printed circuit surfaces.

Figure 31:
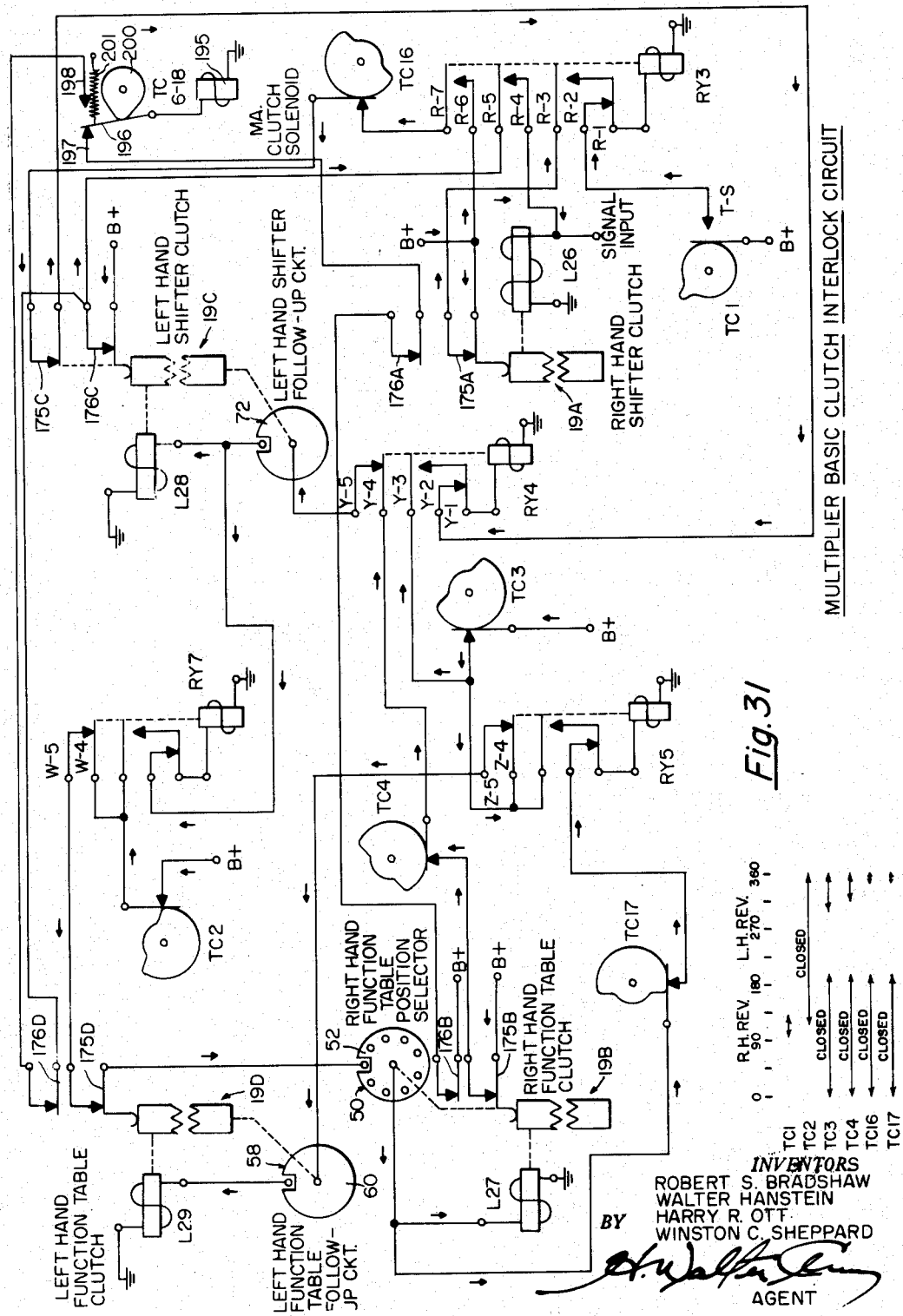
FIG. 31 is a schematic of the preferred clutch control interlock circuit.

To avoid the foregoing injurious results, each of the four motion transmitting clutches is arranged to control two circuit interlocking switches 175 and 176 (FIG. 31), heretofore referred to. These switches, as applied to the circuit of FIG. 31, are respectively identified with the switch reference number plus the letter for its associated clutch. Further, the four switches 175 are controlled to interlock and prevent the above mentioned over-running of moving disks to prevent damage to the printed circuits, while the four switches 176 are controlled to interlock the accumulator circuit to prevent the accumulator from operating while any clutch is running on its half cycle.

Referring to FIG. 31 of the drawings the four clutches, beginning at the lower right, and as already described, are the right hand shifter clutch 19A; the right hand function table clutch 19B; the left hand shifter clutch 19C; and the left hand function table clutch 19D. This FIG. 31 shows only switches 175 and 176 which are involved in the interlocking circuitry between the various clutches. There exists between the four clutches various interlocking relationships as follows: the right hand shifter clutch 19A which selects the next position for the multiplier digit, must be stopped before its position is followed up by the left hand shifter clutch 19C. Conversely, clutch 19C must be stopped before the right hand shifter clutch 19A moves to a new digit position. The left hand shifter clutch 19C must also be stopped before the right hand function table clutch 19B moves to the next multiplier digit. Conversely, the left hand shifter clutch 19C must wait until the right hand function table has moved to the next multiplier digit before the left hand shifter is allowed to move to another new digit position. The left hand function table clutch 19D must wait until the right hand function table clutch 19B has stopped before following up on the new multiplier digit.

During a revolution entering the right hand components in the accumulator, a point is reached when it is possible to move the right hand shifter to the next multiplier digit position. Timing cam TC1, which is synchronized with the operation of the accumulator, momentarily closes its switch TS and energizes relay RY3. A hold circuit for this relay is provided by switch 175A and relay contact R3 to hold the relay closed after the operation of TC1. Contacts R4 and R5 of relay RY3 close, and if the left hand shifter clutch contacts 175C are closed, indicating that the left hand shifter clutch is not engaged, then a current path will be provided to L26, the clutch coil for the right hand shifter. Clutch 19A will become engaged thereby opening contact 175A and removing the hold path from RY3. RY3 will drop out, and if the next multiplier digit is other than zero the current will be removed from L26 and the right hand shifter clutch 19A will declutch, again closing 175A. However, at this point the energizing voltage from TC1 has been removed and the relay will not operate again. Should the next multiplier digit be zero a separate voltage will be applied to L26 to step the column selector to the next digit position as will be discussed later.

Should the left hand shifter clutch 19C be operating at the moment that timing cam TC1 closes, the relay RY3 will become energized and will hold as mentioned previously, but the right hand shifter clutch 19A will not become energized since the contacts 176C on the left hand shifter clutch are open. The relay RY3 will remain energized indicating that it is proper for the right hand shifter clutch to become energized, but the right hand shifter clutch will await the de-clutching of clutch 19C. Should the left hand shifter clutch 19C be called upon to follow up on clutch 19A, while clutch 19A is still engaged, additional circuitry is provided to disable clutch 19C until the right hand shifter has completed its operation as follows: relay RY3, when energized, closes contacts R6 and R7 which provide a circuit through themselves, through TC16, through contacts 176C on clutch 19C, to energize relay RY4 through its own contacts Y1 and Y2. A hold circuit is provided for relay RY4 through its contact Y3 and timing cam TC3. Contacts Y4 and Y5 on relay RY4 are opened thereby disabling the follow-up circuit of clutch C. The foregoing circuits are employed in part to provide a necessary interlocking between 19B and 19C by contacts 175B on clutch 19B, 175C on clutch 19C, and relay RY4. The opening of contacts 175B on clutch 19B disables the follow-up circuit of clutch 19C, thereby assuring that it cannot follow up on the right hand shifter while the right hand function table clutch 19B is in motion. The disabling of clutch 19B while clutch 19C is in motion is provided by relay RY7 which becomes energized by a voltage applied to the clutch coil of clutch 19C, and which locks on a hold voltage provided through TC2. Contacts W4 and W5 of relay RY7 open, thereby disabling the voltage through the right hand function table position selector circuit 52 (FIG. 15). The interlocking of clutch 19D while clutch 19B is in motion is provided by relay RY5 through its contacts Z4 and Z5. The interlocking of clutch 19B while clutch 19D is in motion is provided by contacts 175D on clutch 19D. The respective circuits for the four clutches are controlled by the cams TC1, TC2, TC3 and TC4 in timed relation to the accumulator operation in response to a program voltage control so that the various interlocking relationships take place at appropriate times in the right and left hand revolutions of the accumulator.

From the foregoing it will be seen that provision is made for so interlocking the clutch operating circuits that over-running of the rotatable members is prevented during a portion of a multiplying cycle between either the left hand shifter and the right hand shifter; between either the left hand shifter and the right hand function table, and between either the right hand function table and the left hand function table.

In order to prevent premature operation of the accumulator during a multiplying cycle, as seen in FIG. 31 the accumulator clutch solenoid 195 is arranged to be alternately energized at the end of each right and left hand multiplying operation by a control switch arm 196 pivoted to swing between two contacts 197 and 198, the former being the terminal of a series circuit including the interlocking switches 176A and 176B, and the latter being the terminal of a series circuit including the interlocking switches 176C and 176D. The switch arm 196 is spring-biased to ride on the periphery of a time controlled cam 200 which closes the switch arm 196 and contact 197 when the accumulator stops, at which time the interlocking switches 176A and 176B have closed to thereby energize the accumulator solenoid 195 for one component revolution. When the cam 200 rides away from the arm 196 its spring 201 permits the arm 196 to follow the cam and engage the contact 198 so that the series circuit of interlocking switches 176C and 176D, when closed again, energizes the solenoid 195 to operate the accumulator for its other component revolution. Thus the accumulator is interlocked with each of two pairs of clutch circuits and must wait to operate until the appropriate pair of interlocking switches is closed.

While in the foregoing description the wiper contactors for the respective moving contacts have been shown in mounted position, each embodies important structural details, so reference is now made to FIG. 28 (on sheet with FIG. 19) as an example of all such contactors regardless of how arranged or how grouped with associated parts. Thus in FIG. 28 three wiper contactors are shown pivotally mounted upon a pin 210 of insulating material which is supported by a bracket 211 also of insulating material for attachment to a fixed part. Bracket 211 also mounts three outwardly disposed post connectors 212, which are respectively connected by coil springs 213 to the legs 214 of three parallel spaced apart wiper contactors 215 to ride respectively upon contact lanes, such as shown in FIG. 20. The legs are respectively offset from U-shaped bases 216 of the respective contactors. The arrangement is such that the contactors are biased to wiping relation by the respective springs, which serve also as a means to conduct current from any closed circuit contactor to its post connector. The U-shaped bases of the contactors give a stable support and are insulated one from another by spacer parts of the bracket 211, through which the pivot pin 210 passes.

Figure 32:
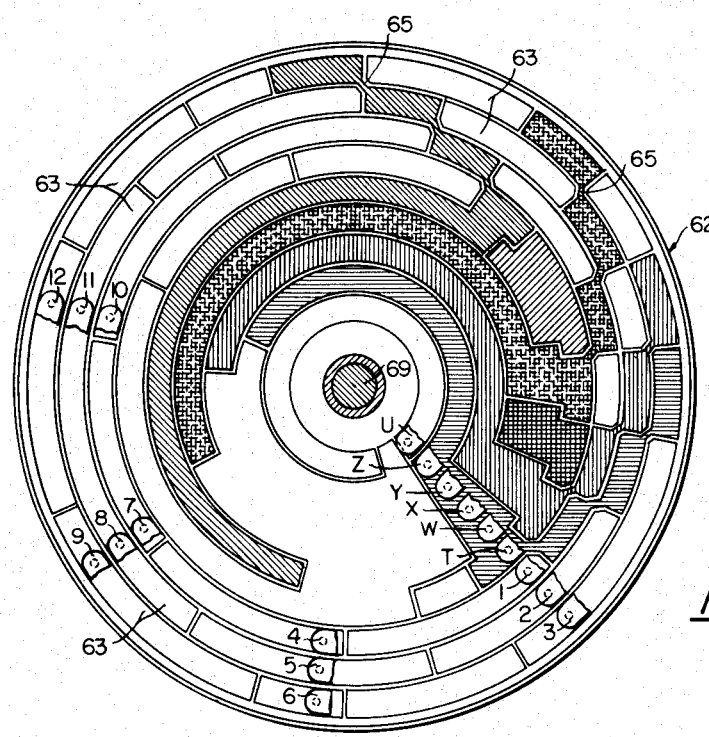
FIG. 32 is another face view of the right hand shifter disk column selector circuit as shown in FIG. 20, but with color shading in accordance with the "Symbols of the Draftsmen" in the Patent Office "Rules of Practice" as an aid in describing the column selecting circuit, only fragments of the contactor assemblies of FIG. 20 being shown.

For the purpose of providing a decimal shift, reference is made to FIG. 32 wherein the divided circumferential contact lanes essential for an understanding of the operation of the zero or digit selection and the selection of the decimal shift, are shown crosshatched for color designation according to the color designations in the Patent Office "Rules of Practice." Thus the three outer segmental contact lanes on which the digit column contactors seat are successively colored arcuately from starting position respectively in blue, red, yellow and green, while those lanes and areas for controlling selected decimal shifts are also crosshatched from starting position respectively in blue, red, black, yellow and brown, these latter lanes passing successively under the row of decimal shift contactors W, X, Y and Z and circuit output "T" which leads to the solenoid 42A of clutch 19A. In the starting position all of these last mentioned contactors seat on the blue area. Also in this assembly the arrangement is for decimal selecting "8," "7," "5" and "2" shifts in which the voltage input for the "8" shift leads to contactor Z; the voltage input for the "7" shift leads to contactor "Y"; and voltage input for the "5" shift leads to contactor "X"; and the voltage input for the "2" shift leads to contactor "W." These voltages are selectively applied by means of a stepping switch and contact control to prevent make and break on the printed circuit. The stepping switch selects, in this instance, the appropriate decimal shift input as dictated by the electrical program control of the tabulating machine. For an "8" decimal shift a voltage is applied to contactor Z to follow the blue area to contactor T which completes the circuit for the solenoid of clutch 19A, which thereupon rotates the disk 62 one step clockwise, as seen in FIG. 32, so that contactor T now rides on the red area to break continuity with contactor Z, and the rotor disk is now correctly positioned to start a column selection. However, at this instant the blue segment of column one has taken the place of contactor T and with Z maintains the circuit so that the zero or digit control takes over to locate the column of the selected digit from the multiplier. The contactor Z rides around the segment arc while the digit contactors maintain the circuit by way of the blue lane segment until the open switch for the proper column stops the clutch. It should be kept in mind that the rotatable shifter disk 62 corresponds to the rotor 164 of the schematic showing of FIG. 29 and functions in the same manner to be kept moving through zeros until an open switch is reached to deenergize clutch A and stop the disk for the position of the column to be used.

For a "7" shift the voltage is applied to contactor "Y" on the blue area starting position thereby completing circuit through contactor "T" to the solenoid 42A of clutch 19A, so the disk starts its turning movement stepping both contactors "Y" and "T" onto the red area. Here circuit continuity exists, so the clutch 19A is still operating and the disk makes another step to bring contactor "T" onto the black area thereby to break circuit continuity with contactor "Y" but the solenoid 42A of clutch 19A is not deenergized because the extended red segment rides into contact relation with the contactor for column one and again the zero or digit routine continues until the open switch for the digit column is found.

For a "5" decimal shift, and still with reference to FIG. 32, the voltage is applied to contactor "X" on the blue area starting stepping rotation of the disk 62, with "X" and "T" contactors passing successively through the red, black and yellow areas where continuity exists and ends with contactor "X" on the yellow and the contactor "T" on the brown area with continuity then broken to fix the decimal location but stepping continues from this starting point for zero or digit column selection because there is now continuity between the yellow segments and contactor "X" through the contactor for column one, this latter riding on the concentric yellow segment. Subsequent operation continues as described above in connection with the 8 and 7 shifts.

For a "2" decimal shift the voltage is applied to contactor "W" establishing continuity through the blue area to clutch control contactor "T," whereupon the disk is rotated through seven steps to locate the starting position for digit selection. There is continuity between "W" and "T" successively through the contact areas of red, black, yellow, brown and green. On the seventh step the contact "W" is on the green area while contactor "T" is on an uncolored isolated segment. However, the green area is extended to maintain the circuit and so start the zero or digit column selection, by reason of the continuity of the green area leading from contactor "W" lane to the three radially circumferentially spaced green segments for successive travel under the sets of digit contactors until the column is located, as heretofore explained. When the disk has come to a stop in the position for the column of the selected digit its opposite face is set so that one branch circuit is ready to transmit a right hand partial product component of the multiplication from the multiplicand to the selected column of the accumulator.

With the stepping of the right hand shifter disk 62, the left hand shifter commutator 72 has closed the circuit for clutch 19C to operate the left hand shifter 73 (FIGS. 22 and 23) which starts from its "HOME" position to step along the columns of the switch unit as a follow-up of the right hand shifter until it is stopped one column ahead of the digit column selected by the right hand shifter disk 62.

Figure 24:
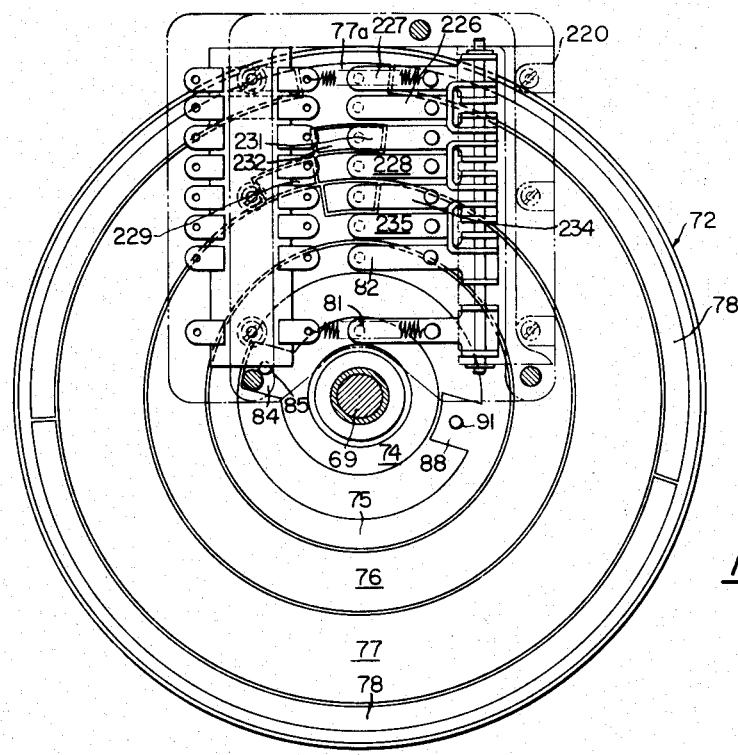
FIG. 24 is a face view on line 24—24 of FIG. 3 of the auxiliary control disk showing the control contactor switch.

For the purpose of selecting one of the foregoing decimal shift positions, reference is made to FIG. 24 wherein disk 72 while functioning as the left hand shifter follow-up, also serves to actuate the decimal shift selecting mechanism and to start the multiplication routine.

The disk is divided into circumferential concentric isolated conducting lanes as previously described, such lanes riding respectively under a row of radially arranged wiper contactors mounted upon a suitable mounted bracket 220. In this assembly contactor 226 serves as the voltage input and rides upon the conducting lane 77 for the full 360 degrees of the rotation of the disk. The output for the voltage to actuate the decimal shift selector is by way of contactor 227 which, initially in the home position, is in contact with an offset portion 77a of lane 77, but after one step the disk then rides on the isolated lane 78 until it again reaches the home position.

Figure 33:
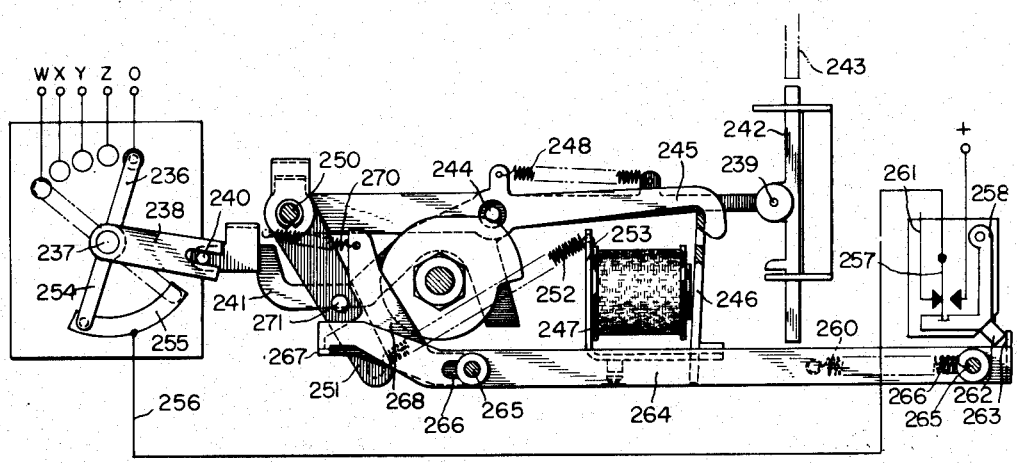
FIG. 33 is a schematic view of an illustrative decimal shift selecting mechanism.

When the carriage of the tabulating machine reaches the multiply position and tabulation stops, a relay means, not shown, but which is hereinafter referred to as the multiplier relay, is energized to apply a voltage to contactor 226 to close the circuit for the decimal selecting shift mechanism by way of contactor 227. This selecting mechanism is fully described in the Jones copending application Serial No. 646,414, filed March 15, 1957, from which a fragmentary showing is made in FIG. 33 of the rotary decimal switch arm 236 and its positioning mechanism. The arm terminates in a wiper contactor to ride successively over a row of four contacts as voltage outputs corresponding respectively to the decimal shift contactors W, X, Y and Z of the right hand shifter disk 62 of FIG. 20, such row of contacts being respectively for 8, 7, 5 and 2 decimal shifts.

The switch arm 236 is medially pivoted on a stub shaft 237 and has an extended arm 238 having a bifurcated end straddling a pin 240 by means of which the switch arm 236 is selectively positioned for the desired decimal shift. The pin 240 projects laterally from one end of a control lever 241, the opposite end of which is pivotally attached at 239 to a tappet 242 of a program control mechanism functioning in conjunction with a program pin 243, which in set position determines the travel of the tappet 242 whereby the decimal setting of the switch arm 236 is in accordance with the program pin 243. Also the control lever 241 has a pivot 244 mounting a latch 245 having a hooked end for latching over an apertured clapper 246 of a solenoid 247. The latch 245 is biased by a coil spring 248 stretched between it and the control arm 241. The latch 245 is the long arm of a bell crank pivoted on a fixed pivot 250 with its short arm 251 biased for counter-clockwise movement by a coil spring 252 stretched between it and a fixed point such as the bracket 253 which carries the solenoid 247. This biasing action is not effective, however, until the latch 245 is released by the energizing of solenoid 247.

Setting of switch arm 236 to the selected decimal shift takes place as follows: assuming the program control panel has been tabulated across the accounting machine to a position where the pin 243 is above the tappet 242 representative of a desired program to be determined by the selected decimal shift, in this instance, a "2" shift or contact W, the pin 243 will be positioned so that the tappet 242 and pivot 239 have minimum travel and hence the left hand end of lever 241 has maximum travel and provides the long swing necessary to shift the switch arm 236 over to contact W. With a pulse applied to the solenoid 247, the latch 245 is released and the spring 252 triggers the lever assembly so that the pivot 244 moves counterclockwise with pivot 239 lifting the tappet 242 until it is stopped by the pin 243. This pivot 239 is now fixed but the pivot 244 continues to move and transmit a clockwise movement of the switch setting pin 240 and thereby turning arm extension 238 and switch arm 236 counter-clockwise to contact position W.

In order to apply an input voltage to the switch arm 236 with a delayed time interval necessary to permit the switch arm 236 to get set on the proper output contact, this arm 236 is extended to terminate in a wiper contactor 254 riding upon an arcuate segment 255 having an attached lead 256 connected to the shiftable contactor 257 of an input control switch of the type wherein a pivoted shifter 258 is biased by a coil spring 260 to swing in the direction to close the contactor 257 with the juxtaposed contact of the voltage input lead 261. Normally the shifter 258 is held restrained by an inwardly spring-pressed plunger 262 seated against a finger 263 and so maintains the switch open until the restraining finger 263 is removed. This finger 263 is fixed to an end of an elongated link 264 mounted for limited reciprocation on studs 265 respectively riding in slots 266. The opposite end of the link 264 terminates in an offset latch detent 267, which in latching position seats in a notch at the end of a bell crank trigger 268 which is pivoted on the stud 265 to rock counterclockwise to release the link 264 by the restoring coil spring 270 stretched between the trigger and a fixed point. In order to release the trigger with the aforesaid delayed action, the spring attached end is in the path of a lug 271 on the arm 251 of the lever 245. Lug 271 is spaced from the trigger 268 a predetermined distance to ensure that the decimal selecting arm 236 can travel to any output contact before the lug 271 shifts the trigger to release the link 264 to supply the input voltage. When the decimal shift voltage is applied the solenoid 247 is energized to release the latch 245 by the withdrawal of the clapper 246 whereupon the triggered mechanism moves the rotor arm 236 to stop on the selected decimal shift contact in accordance with the position of the program controlled pin 243. When the rotor arm 236 stops, a circuit through the arm 236 is closed by the timed shifting of the link 264 to close the switch of shifter 258 and apply the required supplemental voltage to contactor "W" across disk 62 to contactor output "T" to energize solenoid 42A of clutch 19A to cause the disk 62 to move to the selected decimal shift position.

With this stepping of the disk 62 the follow-up disk 72 (FIG. 24) moves the contactor 227 onto the isolated lane 78 and is of no further use because it has fulfilled its function of initiating the decimal shift selecting mechanism. Since the disk 72 has made one step, the contactor 231 has moved from the insulated segment 232 to the conducting surface of lane 77 so that voltage is thereby applied to the multiplier interlock circuits shown in FIG. 31. The disk 72 proceeds to step through the next twenty steps in accordance with the selected decimal shift and the arrangement of digits in the multiplier storage unit. Upon reaching the twenty-first step of the disk 72 contactor 228 rides on to the non-conducting area 229 and becomes electrically disconnected from contactor 226.

Throughout the routine contactor 228 has been serving to supply timing cam TC-1 with a voltage for causing the right hand shifter 62 to step. This source of voltage is no longer needed when the right hand shifter is in the twenty-first or round-off position. Referring to FIG. 20, when disk 62 reaches its twenty-first or round-off position, contact is established between the selected shift input line W X Y or Z and contactor U, and serves to supply a signal to the round-off mechanism. Referring to FIG. 22, the twenty-first position of the left hand shifter disk 73 is known as the "clear" position. In the "clear" position contactors 118 and 119 become isolated from each other by virtue of the fact that contactor 119 rides off of the conducting surface 117 on to an isolated area 221. Throughout the multiply routine contactors 118 and 119 have been serving as a source of hold potential for the multiply relay but now that the twenty-first position of the disk has been reached this source is no longer needed.

The multiply relay which was energized early in the operation of the multiplier is now held closed by means of a timing cam operated switch which will open and release the relay circuit at the appropriate time in the last accumulator cycle known as the clear cycle. Upon release of the multiply relay, contactors 234 and 235 (see FIG. 24), which have been disabled throughout the multiply routine, now are caused to make the right hand shifter 62 take one more step to its home position, thereby causing contactor 234 to ride on to a non-conducting area and break the circuit to clutch solenoid 42A, the right hand shifter clutch. The left hand shifter disk 73 of FIG. 22 will take one step to its home position by means of the follow-up circuit. Contactors 82 and 81 of the disk 72, see FIG. 24, are commutator contactors to conduct the signal on to and off of the follow-up contactor arms of FIG. 25, as has been previously described.

When the right hand shifter 62 and the left hand shifter 73 have reached the twenty-first position relative to the accumulator, the former is ready to carry out a roundoff and the latter is arranged to follow-up for a clearing operation. Round-off and clearing are described in detail in the above identified application of Hanstein et al., Serial Number 693,779.

Generally stated, the round-off consists of adding the digit "5" to a particular column of the answer in the accumulator, which, if the product digit in that column is "5" or greater, will produce a carry in the next column to the left. If the product digit is less than "5" no carry will be produced. The clearing process consists of disabling the carry mechanism of the multiplier accumulator, actuating a "Total" bail and adding the digit "9" into each of the columns of the accumulator to the right of, and including, the column in which the "5" was added.

In the multiplier of this invention there are certain options provided for round-off and clearing; namely, round-off can be provided in either columns 8, 9, 10 or 11 of the multiplier accumulator, the selection of which is by means of the electrical program control panel fully described in the foregoing pending application. The program control panel also provides an option of whether to perform the round-off and clearing or not, or whether to clear and not round off, or to neither round off nor clear.

Figure 37:
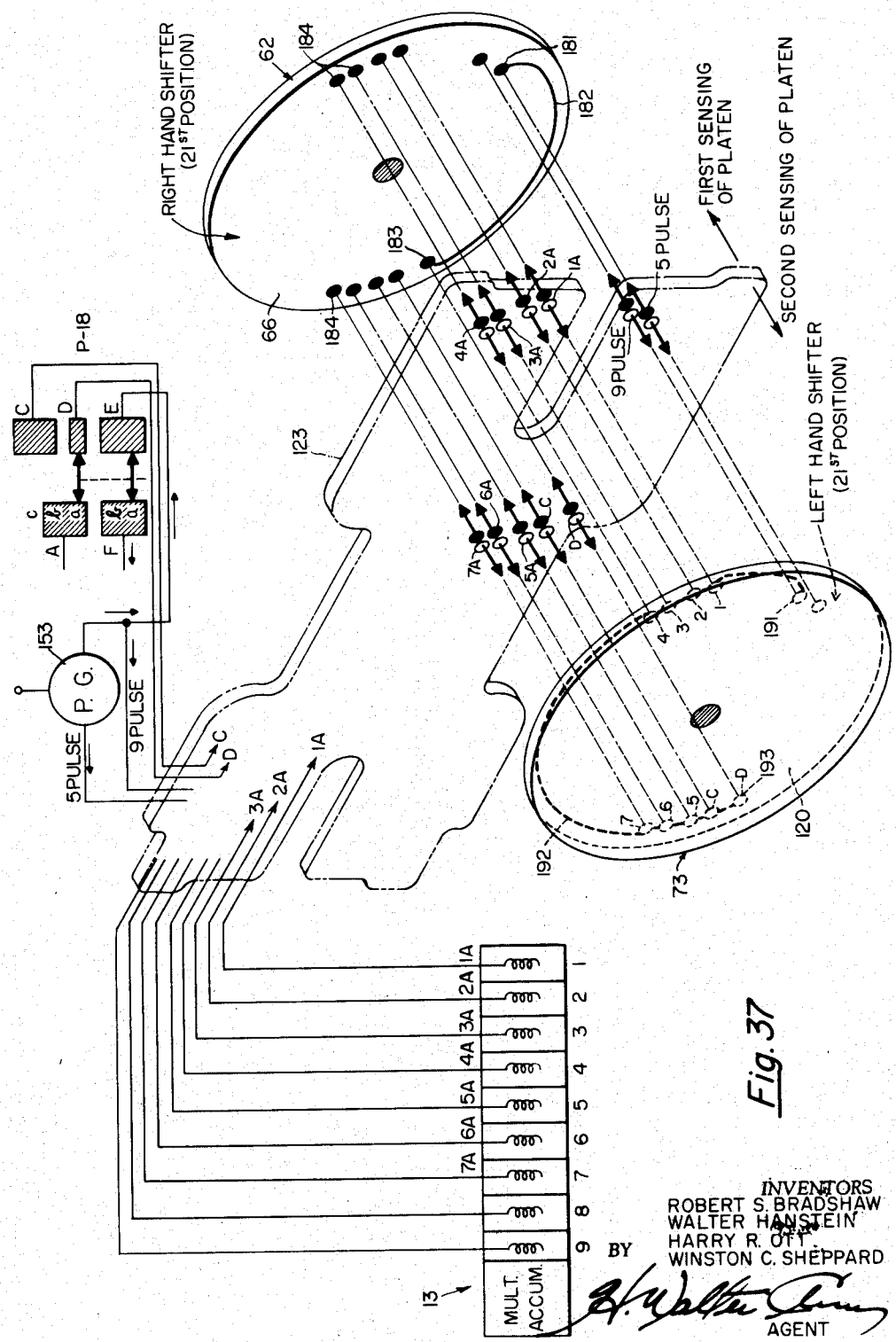
FIG. 37 is a schematic view partially in perspective tracing the route of pulse signals for round-off and clearing.

In describing the round-off as carried out by the right hand shifter 62, it will be assumed that "Z" (FIG. 33) has been selected as the desired decimal shift, so with the shifter disk 62 in the twenty-first position, the "Z" contactor is conductively connected to contactor "U" and voltage is applied to the round-off actuating solenoid L31 (see FIG. 34), but is also available through closed relay 1, to energize the "Total" bail solenoid L35. When solenoid L31 is energized it simultaneously actuates switches for simultaneous contacting with the corresponding juxtaposed contactors 122 of the platen 123. Contact 191 of the branch 192 (FIG. 23) serves as the input for pulse "9" to be routed to its proper column or columns of the accumulator. In FIG. 37, it will be noted that the contacts "1" to "9" are arranged in two spaced groups with column numbers in reversed order, all of which is to simplify the printed circuits and the platen without confusing intersections.

For supply voltage to carry out the required routing a pulse generator 153 is provided for generating pulses "1" to "9" of which the routing of pulses "5" and "9" will be successively followed on FIG. 34. With the platen in contact with right hand shifter disk 62, the lead of pulse "5" connects with the proper contactor 122 of the platen to be routed through input contact 181 of the round-off branch 182 to output contact 183 which is now seated against the proper contactor 122 for routing through its conductor "O" to contact "D" of switch P18, and contact "A" to the selector contact "G" where it traverses switch P19 selector to contact "H" and leads to the accumulator solenoid for column "9." This routing takes place during the round-off revolution of the accumulator, which is started after the last left hand component has been entered. Also since the digit-or-zero sensing varies as to its circumferential travel it is important that the left hand shifter 73 be delayed until the end of the revolution and this is assured by the set interlocking switches as previously described.

With the completion of the routing of pulse "5," the platen 123 is shifted to bring its input contactor 122 for pulse "9" against the sensing contact 191 of branch 192, while seven contactors 122 seat respectively against the "1" to "7" contacts as column outputs to the accumulator. Also, another platen output contactor 122 seats against contact "8" and another platen output contactor 122 seats against contact "9." For routing the pulse "9" from the pulse generator to input contactor 191, it travels by way of contact "E," switch P–18, contact "F" to the proper contactor 122 of the platen 123 and so reaches sensing input contact 191 of branch 192 and then by the respective contactors 122, as outputs, to the respective solenoids of columns "1" to "7." For routing pulse "9" to column "8," the sensing contact "8" is seated against its contactor 122 as an output by way of lead "M" to contact "C" of switch P–18, lead "N" to contact "J," switch P–20 contact "K" to lead "8" for the solenoid of column "8" of the accumulator.

Simultaneously pulse "9" output of branch 192 is in contact with the same contactor 122 of the platen as that for pulse "5" so pulse "9" is routed through lead "O" to contact "D," switch P–18, contact "A," lead "P" to contact "G," switch P–19, contact "H," to lead "9" for the solenoid of column "9" in which pulse "5" has initially been placed.

By reference to FIG. 23 showing one face of the left hand shifter disk 73, the printed circuits comprise two concentric circles of contacts generated about the shaft 66 as an axis, the outer circle being the branch 192 with diametrically disposed groups of four and three contacts respectively for columns "1" to "7" for clearing operations plus two contacts "8" and "9" for pulse routing. The inner circle of contacts correspond respectively to outputs for seating the juxtaposed contactors 122 of the platen 123, which contactors lead to the proper columns of the accumulator. Seating pads for unused contactors 122 are included in both circles.

Following the "clear" cycle after "round-off," the total in the accumulator is transferred to the accounting machine through racks 17, as described in the Hanstein et al. application, Serial Number 693,779, to be stored in a crossfooter 300 (FIG. 1) or printed out by the printing mechanism identified at 301.

As mentioned heretofore shaft 34 and 152 extend through a wall of housing 9 to be connected to a suitable source of power. With reference to FIGS. 1A, 1B and 1C it will be seen that the extending ends of these shafts are provided with flanges 275 and 276 respectively, each comprising an element of a misalignment clutch for connecting the shafts to power drive means. Shaft 34 is directly conected to a drive shaft 277 by bevel gears 278 and 279 the latter being secured to a stub shaft 280 journalled in flanges 281 of a U-shaped bracket 282 secured to plate 283. The inner end of shaft 280 carries the mating part 284 of the clutch connecting shaft 34 to the drive means.

Shaft 277 is supported at one end in U-shaped bracket 282 and at its other end in an L-shaped bracket 285 and carries on its right-hand end one element 286 of another misalignment clutch. The mating portion 287 of the clutch is secured to the left hand end of a shaft 288 journalled in spaced L-shaped brackets 289 and 290 attached to plate 291. Shaft 288 is driven by means of bevel gear 292 attached to the shaft intermediate brackets 289 and 290, and gear 293 secured to one end of a shaft 294 journalled in plates 291 and 295. Shaft 294 is driven by machine motor 296 through sheave 297 on the motor shaft and sheave 298 on shaft 294, by means of belt 299.

Shaft 152 is driven by means of worm 300 secured to shaft 277 intermediate brackets 282 and 285, and a chain of gears 301, 302, 303, 304 and 305 secured to stub shafts supported by plates 283 and 307, and a gear 306 secured to a stub shaft 308. A pin 309 secured to the hub of gear 306 engages the mating part 276 of the misalignment clutch connecting shaft 152 to the drive means.

In accordance with the above description of a preferred embodiment of the present invention, it will now be understood that the invention provides novel multiplying apparatus making possible the automatic multiplication by the right and left hand components method of multiplication wherein the generated partial products are channeled to selected columns of an accumulator and which is effective to cause the accumulator to round off the product and clear itself of unwanted digits prior to transfer of the total to storing or printing mechanism.

What is claimed is:

1. An electro-mechanical multiplier for registering the products of a multiplication in an accumulator having columnar digit indicating means, comprising, a platen, branch conductors on said platen, said branch conductors having conducting contactors projecting from one side of said platen, a member positionable for a multiplying operation by a selected digit, branch circuit conductors on said member said last conductor having contact portions to be engaged by certain of said platen contactors, a shift member to locate the column of the partial product component of the selected digit with respect to the accumulator, branch circuit conductors on said shift member, said last last conductors having contact portions to be engaged respectively by other of said platen contactors, said two members being juxtaposed to the same side of said platen, a multiplier switch bank unit wherein a closed switch is indicative of a stored digit, circuit selecting means operating through a stored digit switch for positioning said members respectively for digit and column contact relation with said platen contactors, a second switch bank unit wherein closed switches are indicative of stored multiplicand digits, means for shifting said platen whereby its contactors are brought into contact relation with the branch circuit conductors on said positioned members to connect selected branch circuits, a source of electrical signals, and means for routing said signals from said source through the connected branch circuits selected by engaged contactors and through closed switches in said multiplicand switchbank, thus to register partial product components with respect to selective columns in the accumulator.

2. A multiplier according to claim 1 wherein said shifter is positioned to locate the right hand partial product components in the accumulator columns for the selected multiplication.

3. A multiplier according to claim 2 wherein means follow up the positioning of said shifter to locate the left hand partial product components in the accumulator columns for the selected multiplication.

4. An electro-mechanical multiplier for registering products of a multiplication in an accumulation having columnar digit indicating means, comprising, a platen, conducting contactors projecting through said platen for closing selected circuits at opposite sides thereof, a disk for selecting a multiplying digit, a function table on said disk settable by said disk for the right hand components of a multiplication, a second function table disk settable as a follow-up of said disk for the left hand components selection, a digit column selector disk for the right hand components, a digit column selector for said left hand components, said function table for the right hand components and said right column selector disk being juxtaposed to one side of said platen, and said left hand disks being juxtaposed to the opposite side of said platen, circuit branches respectively on the faces of the four disks juxtaposed to said platen, contacts respectively forming terminals of said branches to register respectively with said platen contactors, a multiplier bank of switches having a digit stored switch, means responsive to a voltage applied through said stored switch for setting the digit selector for a multiplying operation, means responsive to a second voltage applied through said stored switch for setting the column selector disk to locate the partial products components resulting from said operation in a selected accumulator column, means to shift the platen for contact relation between the disk contacts at one side of the platen and the platen contactors, a second bank of switches having a stored switch for a multiplicand digit, a pulse generator, and means to route pulses selectively from said generator by a path including the platen, a digit multiplying function table, the multiplicand stored switch, and the column selector disk, whereby the partial product components of the multiplication are routed into the proper columns of the accumulator.

5. A multiplying apparatus in accordance with claim 4 wherein means operates said platen shifting means to alternately establish contact relation between the platen contactors and the two pair of digit and column disks.

6. An electro-mechanical multiplier for entering multiplication products into selected channels of an accumulator, the combination of a pulse generator, a platen, a plurality of contactors projecting from one side of said platen as outputs respectively for pulses from said generator, a disk member having a plurality of branch circuit elements having contacts respectively juxtaposed to said contactors, said last elements being arranged in nine areas corresponding to "1" to "9" multiplying digits, a multiplier switch bank, a digit stored switch in said bank, a shaft for said disk member, a clutch means including a solenoid for operating said clutch to turn said shaft, means responsive to a voltage applied to said stored switch for energizing said solenoid means, and means operative to deenergize said solenoid to stop said disk when a contact area corresponding to the stored digit is opposite said juxtaposed contactors, means for shifting said platen to bring said contactors into circuit closing position with said branch circuit contacts, a multiplicand switch bank having a digit stored switch, a digit column selector disk, means to position said selector according to the column of the digit stored in the multiplier, and means for routing a pulse through said platen, said disks and multiplicand unit to the accumulator.

7. In an electro-mechanical multiplier for entering multiplication products into an accumulator having columnar digit registering means, the combination of a pulse generator having a plurality of outputs indicative of sequential numbers, a first array of like numbered contactors, means supporting said contactors in a common plane, means connecting said pulse outputs respectively with said contactors, a disk, means for rotating said disk, digit groups of branch circuits on said disk, each group having a set of input contacts arranged to be selectively brought into a position for respective contact with said contactors, a second array of conductors, means supporting said contactors in the same plane as said first array of contactors, each disk group of branch circuits also having a set of output contacts arranged to contact said second array of contactors when said disk is positioned, a multiplier switch bank, a digit stored switch in said bank, means responsive to a voltage applied to said stored switch for actuating said rotating means, means to stop said rotating means with said digit group corresponding to the stored digit juxtaposed to the two arrays of contactors, means to bring said contactors and contacts to circuit closing position, a multiplicand switch bank, a digit stored switch in said multiplicand switch bank, means for routing a pulse from said generator corresponding to a component of the multiplication of the multiplicand stored digit by the multiplier stored digit, and means for positioning said component in a column to register with the accumulator.

8. In an electro-mechanical multiplier for entering the products of a multiplication in an accumulator of the type having columnar digit indicating means, the combination of a first disk, a plurality of branch circuits on one face thereof representing respectively the right hand partial product components columns of the accumulator, each of said branch circuits heaving an input contact and an output contact, a second disk, a plurality of branch circuits on one face thereof representing respectively the left hand partial products component columns of the accumulator, said disks being spaced apart with said faces juxtaposed, circuit completing means between said faces and spaced therefrom, a multiplying switch bank, a switch on said bank having a stored multiplying digit, means responsive to a voltage applied to said stored digit switch for setting the first disk to select the branch circuit corresponding to the column of the stored digit, means for sequentially closing the space between said circuit closing means and said set first and second disks to close the circuit of the respective digit columns, and a multiplicand switch bank having a switch for first routing an electric signal through said multiplicand stored digit switch, through said circuit completing means to the output of the selected branch circuit on said first disk and from the output of such branch circuit to enter the right hand component of the multiplication into its column of the accumulator, and subsequently to route an electric signal through said multiplicand stored digit switch, through said circuit completing means on said second disk to close a selected circuit of said left hand component to enter the selected component in a different column of the accumulator than the column selected for the right hand component.

9. In an electro-mechanical multiplier for use in conjunction with an accumulator having columnar digit registering means, the combination of a rotatable multiplying table disk member, first circuit controlled means for selecting a multiplying digit, means responsive to said circuit means for rotating said table member to a position for multiplying by the selected digit, a column shifting disk member, second circuit controlled means for rotating said disk member to a position for locating a component of said multiplying operation in its proper column of the accumulator, and switch means rendering both said first and second controlled circuit means inoperative during a portion of a multiplying cycle, to prevent over-running of one of said members with respect to the other.

10. In a multiplier, according to claim 9 wherein means restores said switches to render both circuit means operative, whereby said table and shifter disk members are free for relative movement ready to be set for another portion of a multiplying cycle.

11. In an electro-mechanical multiplier for registering products of a multiplication in digit indicating columns of an accumulator, a column selecting disk having a conducting area on one face, a shaft mounting said disk for rotation, releasable clutch means including a control solenoid for rotating said disk, isolated contact lanes on said face concentric to said shaft, circumferentially spaced conducting areas in each lane, circuit output wiper contactors for certain of said lanes corresponding respectively to digit columns of the accumulator, means including a voltage input wiper contactor seating on said disk conducting area to energize said solenoid in response to an applied voltage to rotate said disk, and means for deenergizing said solenoid to stop said disk when one of said digit contacts is aligned with its selected column, whereby said disk is positioned to match the selected column with the related column of an accumulator.

12. An electro-mechanical multiplier according to claim 11, where said disk has a plurality of column circuit branches on its opposite face for selectively routing a partial product component of a multiplication into the accumulator according to the column selected position of said disk.

13. An electro-mechanical multiplier according to claim 11 wherein said disk has a plurality of column circuit branches on its opposite face for selective routing the lefthand partial product component of a multiplication into an accumulator according to the column selector position of said disk.

14. An electro-mechanical multiplier according to claim 11 wherein said disk has an additional circuit branch with an input and an output for routing the signal for a round-off of the multiplication.

15. An electro-mechanical multiplier according to claim 11 wherein said disk has an additional circuit branch with an input and an output for routing the signal for a clearing operation.

16. In a multiplier for entering products of a multiplication into selected columns of an accumulator, the combination of means including a rotatable table for multiplying by a selected digit to obtain a partial product component of a multiplication, means including a rotatable disk for routing said component into its column for an accumulator, a clutch for said table, a clutch for said disk, means including an electrical control circuit for each of said clutches, a circuit for controlling the operation of an accumulator, a normally closed switch in each of said clutch circuits, and means actuated by the operation of an adjacent clutch in response to one of said clutch circuits for opening its switch whereby the accumulator circuit is rendered inoperative during the operation of this portion of said multiplier.

17. In an electro-mechanical multiplier, the combination of a column selecting shifter disk for the right hand partial product component, a shaft mounting said disk for rotation, means including a solenoid for rotating said disk, a plurality of concentric isolated lanes on one face of said disk, each divided into a plurality of circumferentially isolated segments, a supplemental isolated conducting area, an arcuate conducting area arranged about said shaft as an axis and of predetermined length to define a round-off position of said disk, said arcuate area forming a continuation of said supplemental area, a decimal shift wiper contactor seated on said arcuate area as a voltage input, a digit column selecting circuit, a plurality of digit wiper contactors seated respectively on said lanes as voltage outputs to said circuit, a starting wiper contactor seated on said supplemental conducting area as a voltage input, means for applying a voltage to said decimal shift wiper contact to close said circuit through said supplemental area and starting wiper contactor to energize said solenoid means to step said disk to the selected decimal position, and means controlled by said isolated segments to continue stepping said disk to a column selected by a preset break in said circuit.

18. In an electro-mechanical multiplier according to claim 17 wherein said disk has a plurality of column circuit branches on its opposite face for routing the right hand partial product component into an accumulator according to the selected position of said disk.

19. In an electro-mechanical multiplier the combination of a digit column selecting disk for right hand partial product components, a shaft mounting said disk for rotation, means including a solenoid for rotating said disk, three concentric isolated conducting lanes on one face of said disk each lane comprising a plurality of isolated circumferential segments arranged in groups of three, inter-connecting segments in stepped relation, supplemental radially disposed conducting areas isolated from each other, each area being conductively connected to one of said groups, segmental concentric conducting areas respectively forming continuations of said radial areas, four rows of three digit wiper contactors mounted for contact wiping by the said three lanes as voltage outputs to respective digit column circuits, a plurality of decimal digit wiper input voltage contactors arranged to initially be wiped by one radial conducting area and successively by the other radial areas, each of said input wiper contactors to be wiped by one of said segmental areas, a separate wiper contactor seated on said initial radial area as a voltage output for a circuit including said solenoid disk rotating means, and means for selectively applying a voltage to said decimal shift wiper contactors, whereby said disk is stepped to the radial area corresponding to the selected shift and maintains a circuit from said contactor to one group of lane segments for digit column selector.

20. An electro-mechanical multiplier according to claim 19, wherein said concentric conducting areas vary in length to compensate for residual disk rotation to round-off position according to the selected decimal shift.

21. An electro-mechanical multiplier according to claim 20, wherein means including an actuating solenoid operates in round-off position to correctly route signals to the selected columns of an accumulator.

22. An electro-mechanical multiplier according to claim 21 wherein said routing means is a circular contact of insulating material concentric to said segmental conducting areas and having a gap at round-off position, said disk having a conducting surface under said gap and the wiper contactors, and a round-off wiper contactor riding on said insulated contact to close a circuit with any selected decimal wiper contactor when the round-off wiper contactor is seated in said gap and seated on said conductor surface.

23. A multiplier unit for an accounting machine comprising: a shifter assembly, said assembly comprising a first rotatably mounted shaft, drive means for rotating said shaft, clutch means for connecting said drive means with said shaft to rotate said shaft intermittently, a right hand shifter disk secured to said shaft, circuit elements on the faces of said last mentioned disk, fixed contactors in wiping contact with the circuti elements on one face of said last mentioned disk, a left hand shifter disk rotatably mounted on said shaft, drive means for rotating said last mentioned disk, clutch means for engaging said last mentioned drive means with said last mentioned shaft to drive it intermittently, circuit elements on the faces of said last mentioned disk, fixed contactors in wiping contact with the circuit elements on one face of said last mentioned disk, a control disk secured to said shaft, circuit elements on the face of said last mentioned disk, fixed contactors in wiping contact with the circuit elements on one face of said last mentioned disk, contactors in wiping engagement with the circuit elements on the other face of said last mentioned disk, said last mentioned wiping contactors being rotatable with said left hand shifter disk; a function table assembly comprising, a second rotatably mounted shaft, drive means for rotating said shaft, clutch means for engaging said drive means with said shaft to drive the latter intermittently, a right hand function table disk secured to said shaft for rotation therewith, circuit elements on the faces of said last mentioned disk, fixed contactors in wiping engagement with the circuit elements on one face of said last mentioned disk, a left hand function table disk rotatably mounted on said shaft, drive means for rotating said last mentioned disk, clutch means for engaging said drive means with said last mentioned shaft to drive it intermittently, circuit elements on a face of said last mentioned disk, a function table control disk secured to said shaft for rotation therewith, circuit elements on the faces of said last mentioned disk, fixed contactors in wiping contact with the circuit elements on one face of said disk, and contactors in wiping contact with the circuit elements on the other face of said disk, said last mentioned contactors being rotatable with said left hand function table disk; and a platen having portions straddling said shafts between said right and left hand shifter disks and said right and left hand function table disks, contactors arranged on said platen portions normally out of contact with the circuit elements on the faces of said disks between which said portions extend; and means to shaft said platen toward the disks on either side thereof whereby said contactors are brought into contact relation with the circuit elements on said disks selectively.

24. An electro-mechanical multiplier comprising, a first switch means including a plurality of switches individually settable for storing multiplier digits, a second switch means including a plurality of switches individually settable for storing multiplicand digits, a digit selecting member for selecting digits for the partial product components of a multiplication, means for positioning said member in accordance with a set switch in said first switch means indicative of a multiplier digit, an accumulator having columnar digit indicating means, a column selector member for routing said partial product components into selected columns of the accumulator, means for positioning said column selector member in accordance with a set switch in said first switch means, a source of electrical signals, and signal conducting means for routing signals from said source sequentially through said digit selecting member, said multiplicand storage switches, said column selector member and to said acculator, thus to register said partial product components in selected columns of the accumulator.

25. An electro-mechanical multiplier comprising, a first switch means including a plurality of switches individually settable for storing multiplier digits, a second switch means including a plurality of switches individually settable for storing multiplicand digits, a first digit selecting member for selecting digits for the right hand partial producing components of a multiplication, a second digit selecting member for selecting digits for the left hand partial product components of said multiplication, means for positioning said members in accordance with a set switch in said first switch means indicative of a multiplier digit, an accumulator having columnar digit indicating means, a first column selector member for routing right hand partial product components into selected columns of said accumulator, a second column selector for routing left hand partial product components into selected columns of said accumulator, means for positioning said column selector members in accordance with the position of a set switch in said first switch means, a source of electrical signals, and signal conducting means for first routing signals from said source sequentially through said first digit selecting member, said multiplicand storage switches, said first column selector member and to said accumulator, thus to register said right hand partial products components in selected columns of said accumulator, and then to route signals from said source sequentially through said second digit selecting member, said multiplicand storage switches, said second column selector member, and to said accumulator, thus to register said left hand partial product components in selected columns of said accumulator.

26. A construction according to claim 25 wherein said digit selecting members and said column selecting members include branch circuits; and said signal conducting means includes a shiftable platen having conducting contactors extending therefrom and branch circuit conductors thereon connected to said contactors, said source of electrical signals, said multiplicand switches, and said accumulator; and further including means to shift said platen first to bring said contactors into conductive relation with the branch circuits of said first digit selecting member and said first column selecting member, and subsequently to shift said platen away from said first digit selecting member and said first column selecting member and into contact with said second digit selecting member and said second column selecting member, whereby said right and said left hand partial products are routed into the selected columns of said accumulator.

References Cited in the file of this patent

UNITED STATES PATENTS

| 1,622,279 | Bryce | Mar. 29, 1927 |
| 1,870,705 | Black | Aug. 9, 1932 |
| 1,968,123 | Bricker | July 31, 1934 |
| 2,045,437 | Daly | June 23, 1936 |
| 2,178,950 | Bryce | Nov. 7, 1939 |
| 2,224,774 | Tauschek | Dec. 10, 1940 |

UNITED STATES PATENT OFFICE
CERTIFICATE OF CORRECTION

Patent No. 3,002,689                      October 3, 1961

Robert S. Bradshaw et al.

It is hereby certified that error appears in the above numbered patent requiring correction and that the said Letters Patent should read as corrected below.

Column 3, line 20, for "before" read -- be more --; column 16, line 50, for "precice" read -- precise --; line 74, for "not" read -- now --; column 23, line 20, for "The" read -- This --; column 25, line 14, strike out "last", second occurrence; column 26, line 40, for "conductors" read -- contactors --; column 30, line 18, for "producing" read -- products --.

Signed and sealed this 10th day of April 1962.

(SEAL)
Attest:

ERNEST W. SWIDER
Attesting Officer

DAVID L. LADD
Commissioner of Patents